INVENTOR.
Eddy Hose

March 29, 1966  E. HOSE  3,243,811
DIGITAL PHASE MEASURING AND FILTERING SYSTEM
Filed Nov. 1, 1961  12 Sheets-Sheet 4

INVENTOR.
Eddy Hose

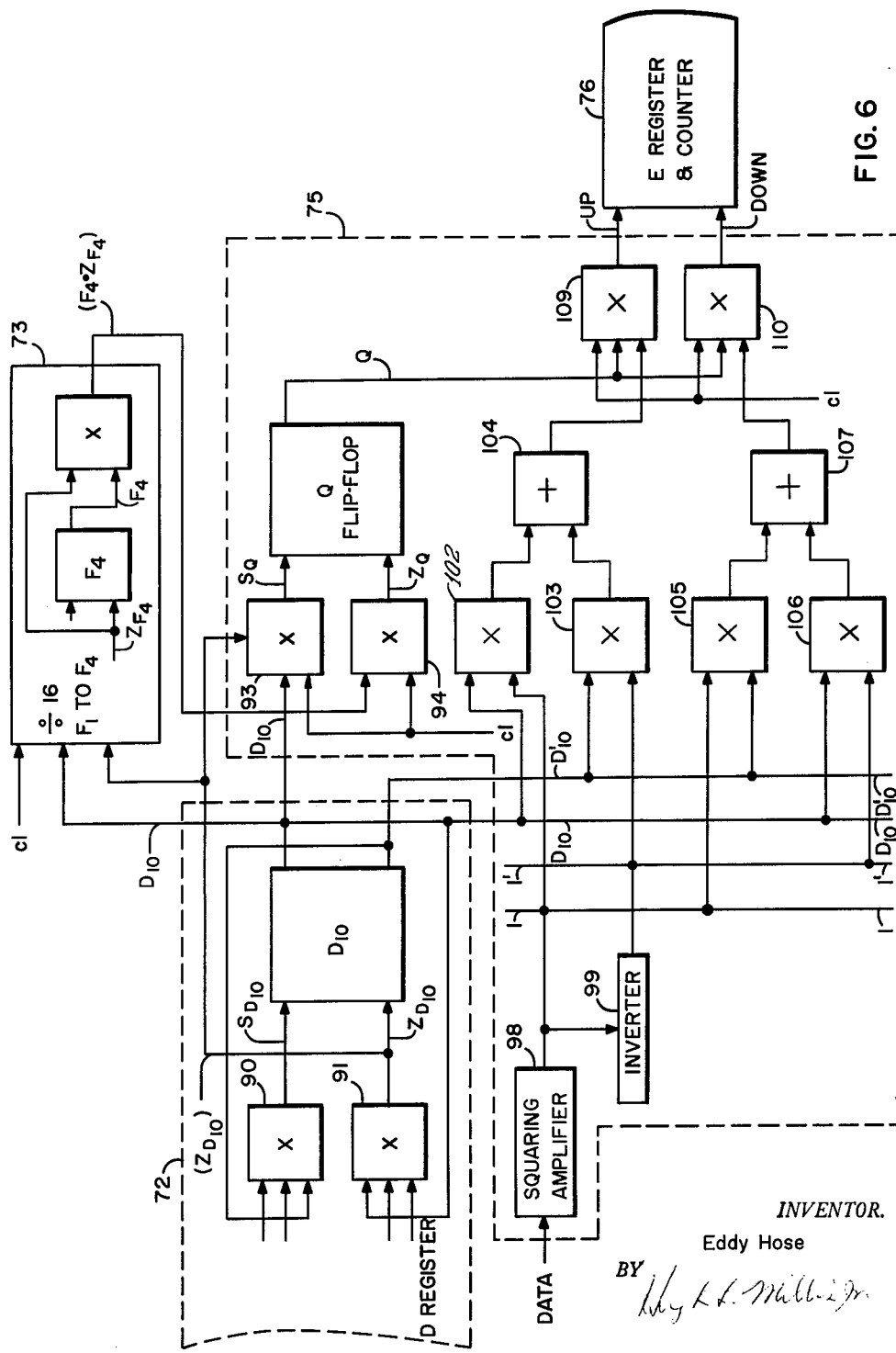

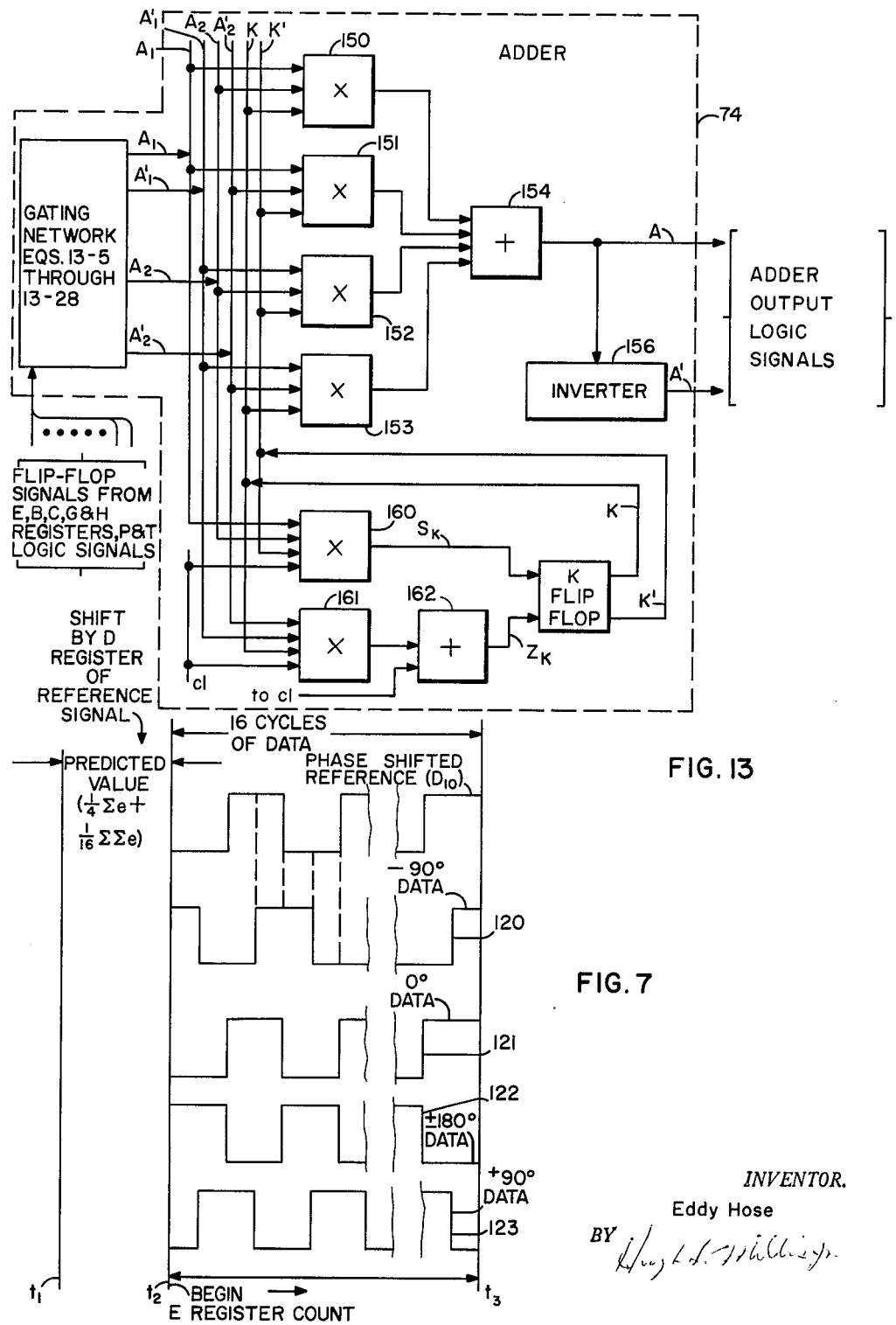

March 29, 1966          E. HOSE          3,243,811

DIGITAL PHASE MEASURING AND FILTERING SYSTEM

Filed Nov. 1, 1961          12 Sheets-Sheet 7

*INVENTOR.*
Eddy Hose

March 29, 1966  E. HOSE  3,243,811
DIGITAL PHASE MEASURING AND FILTERING SYSTEM
Filed Nov. 1, 1961  12 Sheets-Sheet 8

INVENTOR.
Eddy Hose

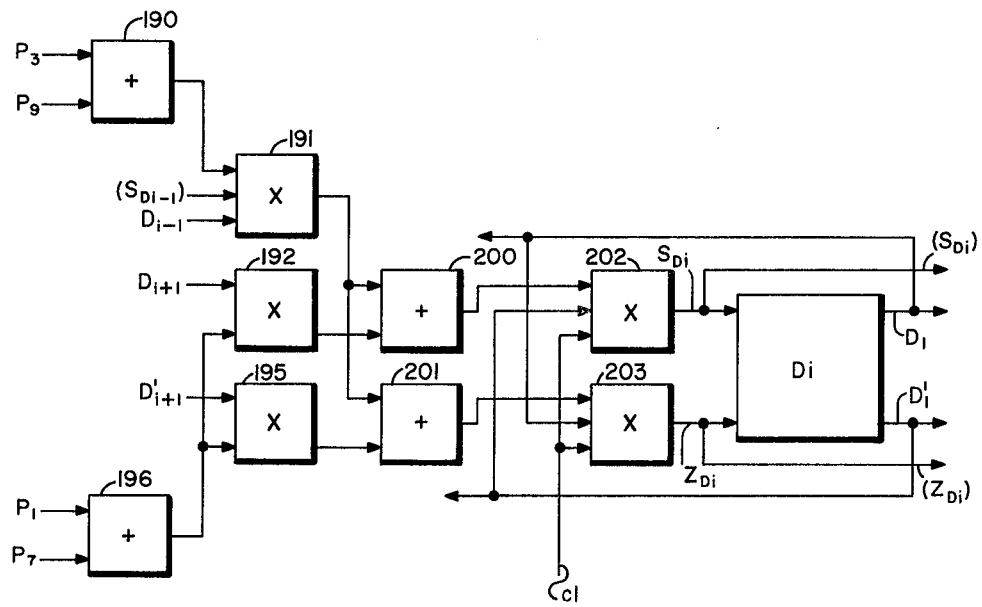
(a)
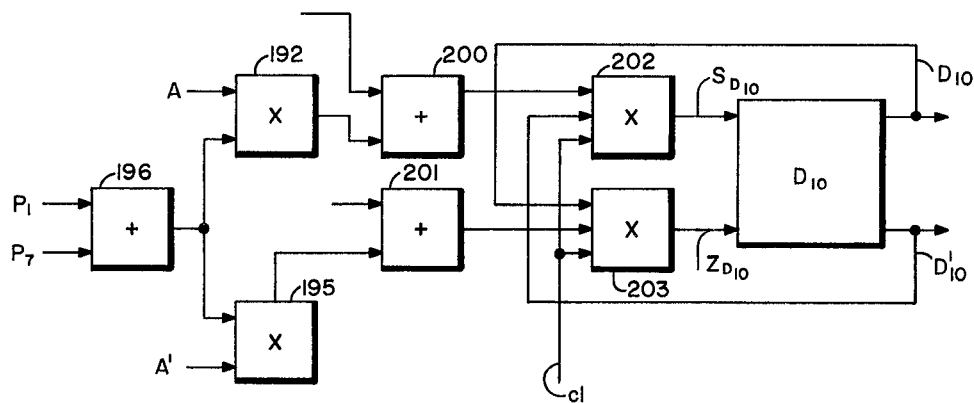
(b)
FIG. 15

March 29, 1966 E. HOSE 3,243,811
DIGITAL PHASE MEASURING AND FILTERING SYSTEM
Filed Nov. 1, 1961 12 Sheets-Sheet 12
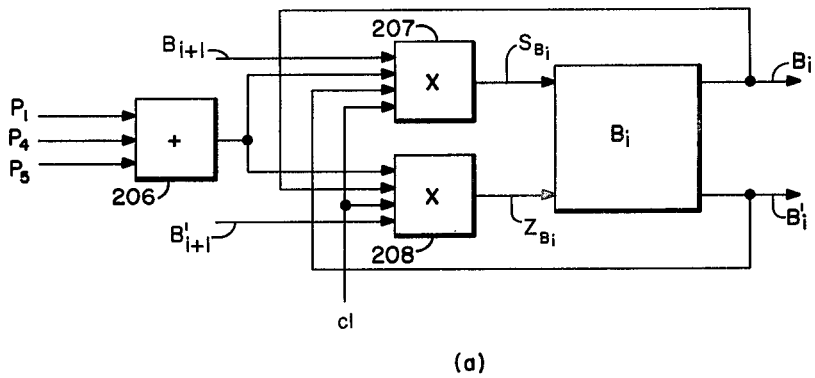
(a)
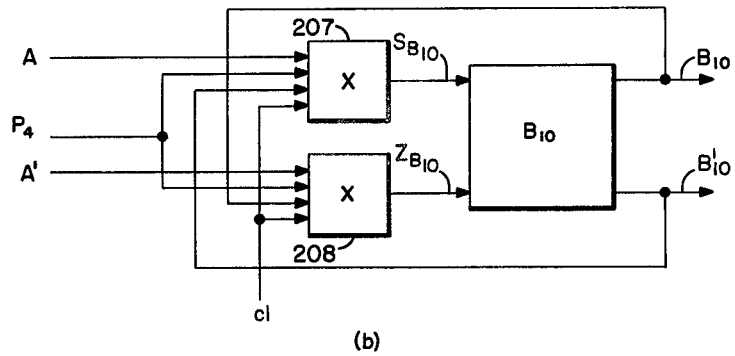
(b)
FIG. 16
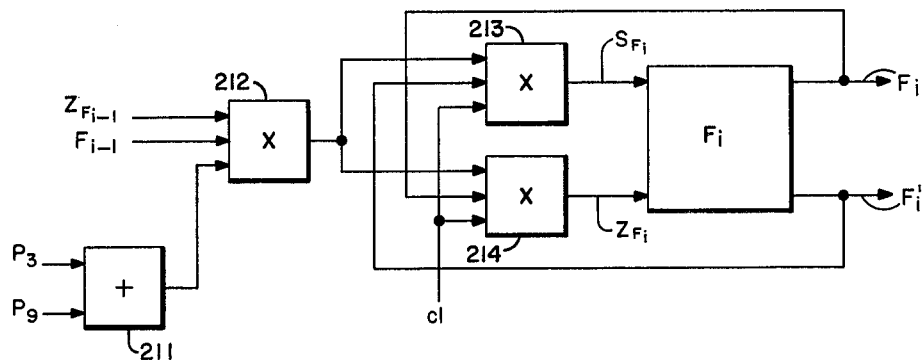
FIG. 17
*INVENTOR.*
Eddy Hose
BY *Hugh L. Milligan*

United States Patent Office

3,243,811
Patented Mar. 29, 1966

3,243,811
DIGITAL PHASE MEASURING AND FILTERING SYSTEM
Eddy Hose, San Diego, Calif., assignor to Cubic Corporation, San Diego, Calif., a corporation of California
Filed Nov. 1, 1961, Ser. No. 149,304
11 Claims. (Cl. 343—12)

The present invention relates to a digital phase measuring and filtering system for use with multiple target C.-W. phase comparison tracking systems, and, in particular, to a multiple target tracking system employing digital sampling, filtering and prediction techniques for converting and smoothing noisy phase difference information representing tracking information into corresponding binary numbers.

The present system is primarily concerned with converting phase difference information, which relates to the location of a target vehicle, into a corresponding binary number by employment of a unique digital filtering, smoothing and prediction technique. There are two basic techniques representing target location. One of these is by employment of so-termed distance measuring equipment, or DME, in which a reference signal is modulated on a carrier signal and transmitted to a transponder in the target vehicle. In the transponder, the modulation signal is extracted and remodulated on an offset carrier signal, and returned to the ground station. The resulting phase difference between the reference and returned data signal represents twice the slant range to the target vehicle, since a C.-W. signal propagated through space undergoes a phase shift proportional to the distance traveled. The principles of DME techniques are set forth and established in considerable detail in the U.S. Patent Number 3,111,665, entitled "A Sequenced Spatial Coordinate Determining System," issued November 19, 1963, to R. V. Werner, Walter J. Zable and William J. Thompson and having a common assignee with the present application.

The other basic C.W. phase comparison technique in which position information of a remote vehicle is established as a phase difference between two signals is through the use of angle measuring equipment or AME. According to this principle, a single C.W. carrier signal is transmitted from the vehicle and received on a pair of antennas, spaced from each other a known fraction or multiple of the wave length of the transmitted signal frequency. The signals received by the antenna pair are mixed with a pair of offset carrier signal frequencies, differing from each other in frequency and phase by an amount corresponding to a separately generated reference signal. A final signal is obtained following a series of mixing operations whose phase relationship with the reference signal represent the direction cosine of the target vehicle referenced to the center line of the antenna pair. The AME technique is set forth and described in considerable detail in the U.S. Patent No. 2,976,530, entitled "Multiple Target Tracking System," to Robert V. Werner, Walter J. Zable, William J. Thompson and Arthur E. Noyes and having a common assignee with the present application.

In each of the above described techniques, it is necessary to convert the resulting phase difference information into some utilizable form, for example, a shaft position, a binary number, an analog voltage for display and/or computational purposes. In the two abovementioned references, the phase difference information is converted into a shaft position by electro-mechanical servo techniques. According to this technique, the reference signal is passed through a resolver which, in turn, is driven by a servo motor such that the resolver shaft position shifts the phase of the reference signal to be in phase with the data signal. Potentiometers and binary shaft encoders may be attached to the servo motor shaft to extract analog voltages and binary numbers, respectively, for use as output quantities.

Another technique for converting phase difference information into a useful output form, which is applicable to both AME and DME systems, is found in another U.S. Patent No. 2,991,462, entitled "Phase-to-Digital and Digital-to-Phase Converters," to Eddy Hose, the inventor of this application, in which the phase difference between two signals is converted into a binary number. According to the basic technique there described, two channels are employed, one for each of two signals to be phase compared. Each channel includes a phase discriminator whose output voltage drives a voltage controlled oscillator or VCO. The output signal of the VCO is counted down by a n-stage binary counter and both the input signal and the output signal from the final stage of the counter is applied to the phase discriminator.

Now, if the incoming signal frequency is $f$, and the VCO effectively multiplies this signal frequency to $2^n f$, then the signal fed back from the last stage of the counter is of the same frequency, $f$, as the input signal.

The circuit operates to produce a continuously varying count in the counter whose magnitude, at any instant, actually represents the phase of its input signal measured from its last zero crossover point. Hence, by applying data and reference signals to a pair of these channels, the instantaneous difference between the counts in the two channels at any instant yields a binary number whose value corresponds to the phase difference between the two respective input signals.

One characteristic common to both types of phase comparison techniques, AME and DME, is that the noise appearing on the data signal, assuming reasonable power emissions and distances, acts to randomly shift the zero-crossing point of the data signal, corresponding to its phase angle relative to the noise free reference signal, about its true or position determining point. Now, the electro-mechanical servo described previously, smooths or averages out the data signal noise component by the inertia and damping characteristics of the servo drive motor, associated gear train and pick-offs. Hence, a filtering or smoothing operation is inherently achieved and the output shaft position represents the averaged data signal phase shift, regardless of noise components, for reasonable signal-to-noise characteristics. In the other or electronic technique for converting phase difference information into binary numbers, the VCO acts to smooth out the noise appearing in the data input signal since it includes an electrical filtering network in its input circuitry. Hence, its binary number at any instant is referenced to the average zero crossing point of applied, noisy data signal.

The filtering performed in both of the above described techniques is entirely adequate for normal applications. A basic difficulty occurs, however, whenever extensions of either technique are considered for handling large numbers of targets on a time-shared basis, inasmuch as the filtering or smoothing involved must be performed on a relatively continuous basis to obtain satisfactory data signal averaging.

In particular, both of these two servoing techniques may be employed in two different ways for tracking multiple targets. According to one, individual servos are employed for each target vehicle with the target being sequentially sampled, with position data being routed for each sample to the proper target servo. The filtering inherent in each of the two types of servos acts to both maintain the target velocity and acceleration components between sample intervals and filter out noise components, as explained. Quite obviously, the amount of equipment needed for handling even reasonable numbers of targets becomes excessive since a complete servo unit is required for each target handled.

According to the other technique of providing multiple target tracking capabilities, the same servo, either electromechanical or electronic, is time shared by all targets. This approach, however, severely limits the number of target samples which may be taken per unit time since a sufficient interval must be allotted for servo null to be obtained each sample interval. This time to null, in turn, is a direct function of the servo filtering characteristics, and hence, the greater the noise smoothing characteristics of the servo, the greater the time required for null to be obtained and the fewer the target samples which may be taken per unit time.

Another and more obvious technique for obtaining a large number of target samples per second would be to count a relatively high frequency clock into a counter between respective data and reference singal zero crossover points, the resulting count representing the phase difference. The equipment for performing this operation would be relatively simple, and could be time shared between a number of targets at a high sampling rate. However, the noise in the input data signal, in causing random shifts of the data signal zero crossover point, would introduce random errors into each digital number thus obtained. Hence, each sample would be of only limited accuracy and relatively involved digital smoothing techniques would later be required, say in a general purpose computer, for reducing and smoothing out these noise components. This approach is not generally suitable for real time tracking requirements, for example, in air traffic control.

The phase measuring technique employed in the present system essentially combines the better features of the pair of above mentioned techniques, that is, the simplicity and high sampling rate inherent in counting between reference and data signal zero crossovers, and the filtering characteristics of the electro-mechanical and electronic servoing techniques.

In particular, the basic digital filtering unit according to the present inventions includes a pair of binary number registers, one of which holds a number representing essentially the recent, averaged target "velocity" and the other holds another number representing essentially the "acceleration" or rate of change of velocity of the target's movement. Each target sample interval is initiated by adding the contents of these two registers to produce a number which represents a predicted value of the next slant range measurement. Then, any difference between the predicted and actually measured value, representing an error number due to noise and/or actual change of the target's acceleration, is multiplied by a constant and added to the contents of the acceleration register. The contents of this "acceleration" register are then multiplied by a constant and added to the "velocity" register. This error number manipulation acts to effectively filter out data signal noise and provide smoothed, stored data which may be employed for target output information in addition to predicting target position at the next sample interval.

The basic digital sample and filtering technique thus described is embodied in the present invention as a portion of a two target distance measuring or DME system. In particular, a reference signal is continuously modulated on a transmitted carrier signal, while a pair of keying tones are alternately modulated on the carrier signal. The transmitted carrier signal is received by the transponders carried on the pair of target vehicles, each transponder being tuned to a different keying tone. Then, each transponder responds to the appearance of its particular keying signal in the received carrier signal to return the range signal, in the manner previously described for DME techniques. On the ground, the reference signal and the returned data signal from the particular responding transponder are passed to an input conversion unit which forms a binary member representing the phase difference between the reference and data signals.

This conversion is performed by initially producing a predicted slant range value by adding the previously formed "velocity" and "acceleration" numbers corresponding to the interrogated target and then counting a high frequency clock signal into the register holding the predicted value until the first overflow occurs. This counting until first overflow acts to shift the reference signal an amount in phase corresponding to the predicted value. Following this, the phase difference between the data and shifted reference signals are determined and an error number generated which corresponds to the phase difference. This is accomplished by counting the clock signal in an up or positive direction wherever the data and phase shifted reference signal are of the same polarity and counting it down or in a negative direction whenever the two signals are of opposite polarity. This counting operation results in a zero error count only if the predicted and measured values correspond exactly. Any count remaining represents an error between predicted and measured values, caused by noise or changes of target acceleration, and is multiplied by ¼ and added to the first or "acceleration" stored number register corresponding to the interrogated target. Then, the new first number is multiplied by ¼, as described earlier, and added to the second number to form the new second number.

Following this cycle of operation, the second keying tone is inserted in the ground station carrier signal and transmitted. The other transponder responds to this transmission and returns the signal to the second target servo position of the system which then performs the identical digital prediction and smoothing operation just described for the first target digital servo section.

It is, accordingly, the principal object of the present invention to provide a digital system which periodically produces output binary numbers representing the averaged value of a noisy, varying analog input quantity.

Another object of the present invention is to provide a digital sampling and filtering system which periodically converts a varying input analog signal into corresponding digital numbers, performs a digital averaging process on the converted numbers, and produces output numbers representing a filtered average of the input analog signal.

Still another object of the present invention is to provide a digital system for averaging a series of input binary numbers representing a varying input analog quantity where the system includes a pair of stored numbers and mathematically manipulates the pair of numbers at each of a series of spaced intervals to produce an output number which represents the predicted next value of the series of input binary numbers, and then employs the difference between the predicted and the next input binary number to modify the values of its pair of stored numbers in a direction to minimize the difference value just obtained.

A further object of the present invention is to provide a digital system for converting and smoothing varying analog input data into smoothed digital number information at spaced intervals by mathematically manipulating first and second numbers at each of the spaced intervals to produce an output numerical value representing the predicted analog value, deriving a number representing the difference between the predicted and actual analog value at each of the intervals, and employing the difference number to modify the values of the first and second numbers in a direction to minimize the difference number.

A still further object of the present invention is to provide a digital system which produces a series of binary numbers at a series of spaced intervals which represent the predicted phase difference between a pair of signals and which then measures the actual phase difference at each of the spaced intervals and corrects the next predicted value based on the difference between the previous predicted and measured values.

Another object of the present invention is to provide a digital system producing output binary numbers at spaced intervals representing the recently averaged phase difference between a pair of applied signals, where the system displaces one signal an amount corresponding the averaged phase difference, measures the actual phase difference between remaining signal and the displaced signal to derive an error number, and employs the error number to correct its next output binary number.

Still another object of the present invention is to provide a digital sampling and smoothing system which produces output binary numbers at spaced intervals representing the predicted phase difference between a pair of signals, the system displacing one signal an amount corresponding to the output number at each of the spaced intervals, generating an error number which corresponds to the phase difference between the phase-shifted signal and the other signal, and then employing each error number to modify the next predicted value in a direction to decrease the just-created error number.

A further object of the present invention is to provide a digital system which operates at spaced intervals on a pair of stored numbers to produce an output number representing a predicted phase difference between a pair of input signals and which employs the predicted number to shift the phase of one of the input signals an amount corresponding thereto, operates on the difference between the phase shifted signal and the remaining signal to produce another binary number which represents an error between the predicted and measured phase difference values, and employs the resulting error number to modify the magnitudes of its pair of stored numbers in a direction such that the predicted number produced at the next sample time tends to decrease the error number just produced.

A further object of the present invention is to provide a digital system for use with a target tracking unit producing output target location information, in which the digital system produces a series of output binary numbers representing a series of predicted target locations, respectively, measures each of the target locations, effectively compares each measured value with the predicted value, and employs each difference obtained to improve the next following predicted value.

A still further object of the present invention is to provide a digital system for use with a multiple target tracking system which sequentially interrogates a series of targets and produces a respective series of phase differences to the respective series of targets representing their respective series of locations, in which the system produces a series of binary numbers representing a series of predicted locations of the series of targets, takes a series of measurements of the locations of the series of targets, compares each predicted and corresponding measured target location value to produce thereby a series of difference values, and employs the series of difference values to correct the next series of predicted target location values.

Another object of the present invention is to provide a tracking system which sequentially determines the slant range to first and second target vehicles in the form of first and second respective phase differences between a pair of signals and then employs the first and second phase differences for producing first and second binary output numbers representing predicted slant ranges to the first and second vehicles, respectively, by mathematically manipulating first and second sets of stored binary numbers, respectively, comparing the predicted and actual phase differences for the first and second number sets and then adjusting their respective values based on the resulting error numbers obtained.

Other objects, features and attendant advantages of the present invention will become more apparent to those skilled in the art as the following disclosure is set forth including a detailed description of a preferred embodiment of the invention as illustrated in the accompanying sheets of drawings, in which:

FIGURES 3a and 3b illustrate the digital filtering and prediction technique employed;

FIGURE 6 shows the input converter logic unit of the digital system;

FIGURE 7 illustrates a group of typical reference and data signal waveforms appearing in the digital system;

FIGURE 13 is a block diagrammatic representation of the adder unit within the input converter;

FIGURES 15a and 15b represent a typical flip-flop stage and the final flip-flop, respectively, both with associated gating circuitry, of the D register unit in the input converter;

FIGURES 16a and 16b illustrate a typical flip-flop stage and the first flip-flop, respectively, of the B register, with associated gating circuitry, taken as a typical register in the output conversion units; and FIGURE 17 illustrates a typical flip-flop and associated gating circuitry of the F divider unit in the input converter.

Figure 1:
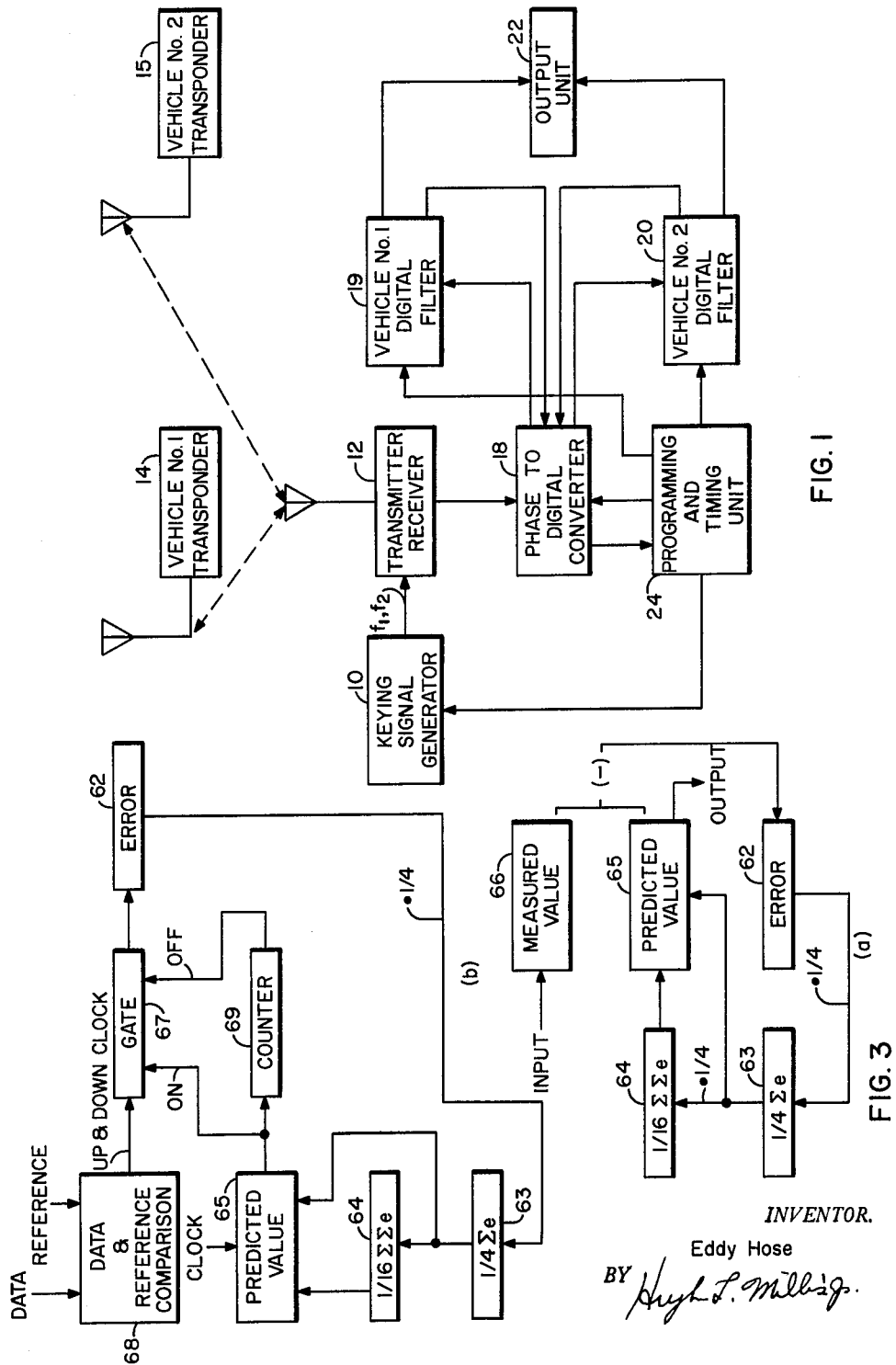
FIGURE 1 illustrates in block diagrammatic form the basic multiple-target distance measuring system employing the digital filtering and prediction technique according to the present invention.

FIGURE 1 illustrates in block diagrammatic form, the principle subsystems constituting the distance measuring system according to the present invention. In particular, the output signals $f_1$ and $f_2$, of a keying signal generator 10 are applied to a transmitter-receiver unit 12 which is in alternate signal communication with a pair of transponders 14 and 15, assumed located in a pair of remote first and second vehicles, respectively, not specifically illustrated. The received output signal information from transmitter-receiver 12 is applied to a phase-to-digital converter 18. In addition, the input and output terminals of a pair of digital filters, 19 corresponding to the first vehicle, and 20, corresponding to the second vehicle, are connected to converter 18. Also, the output data produced by filters 19 and 20 are applied to an output unit 22. Finally, a programming and timing unit 24 applies programming and timing signals to keying signal generator 10, phase-to-digital converter 18 and digital filters 19 and 20.

Although the detailed operation of the system shown in FIGURE 1 will become more clear after subsequent figures are described, it may be briefly stated that keying generator 10, controlled by programming unit 24, alternately passes keying signals $f_1$, and $f_2$ to transmitter-receiver unit 12. These tones, including an internally generated range signal, are modulated on an output transmited carrier signal. The transponder units are respectively tuned to the two keying signal frequencies and each transponder, upon appearance of its particular keying signal, retransmits the received range signal but modulated on a different or offset carrier signal frequency. The range signal is then extracted by transmitter-receiver 12 from the received transponder signal and both it and the original range signal are passed to converter 18. The phase difference between the original range signal and the delayed range signal received back from each transponder is a function of twice the transponder's slant range distance from the ground station. This is due to the well-known physical phenomenon that a transmited signal experiences a phase delay which is a function of its wavelength and distance traveled.

Next, considering, for example, an interrogation cycle of the first vehicle, filter unit 19 will have had built up within it, based on past interrogations, numbers representing roughly an estimated slant range velocity and slant range acceleration. Based on these stored numbers, the new transponder slant range value is predicted and this predicted value is passed into the phase digital converter where it is effectively compared with the new, actually measured slant range. A difference or error value, appearing as a digital number, is taken and stepped back into filter unit 19 where it is employed to correct the past history or stored numbers and hence improve the accuracy of the next predicted value. This prediction, error determination and up-grading of the factors employed to make the next prediction is performed alternately for the first and second vehicle transponders and the resulting output values are passed into an output unit 22 for storage, display etc.

Figure 2:
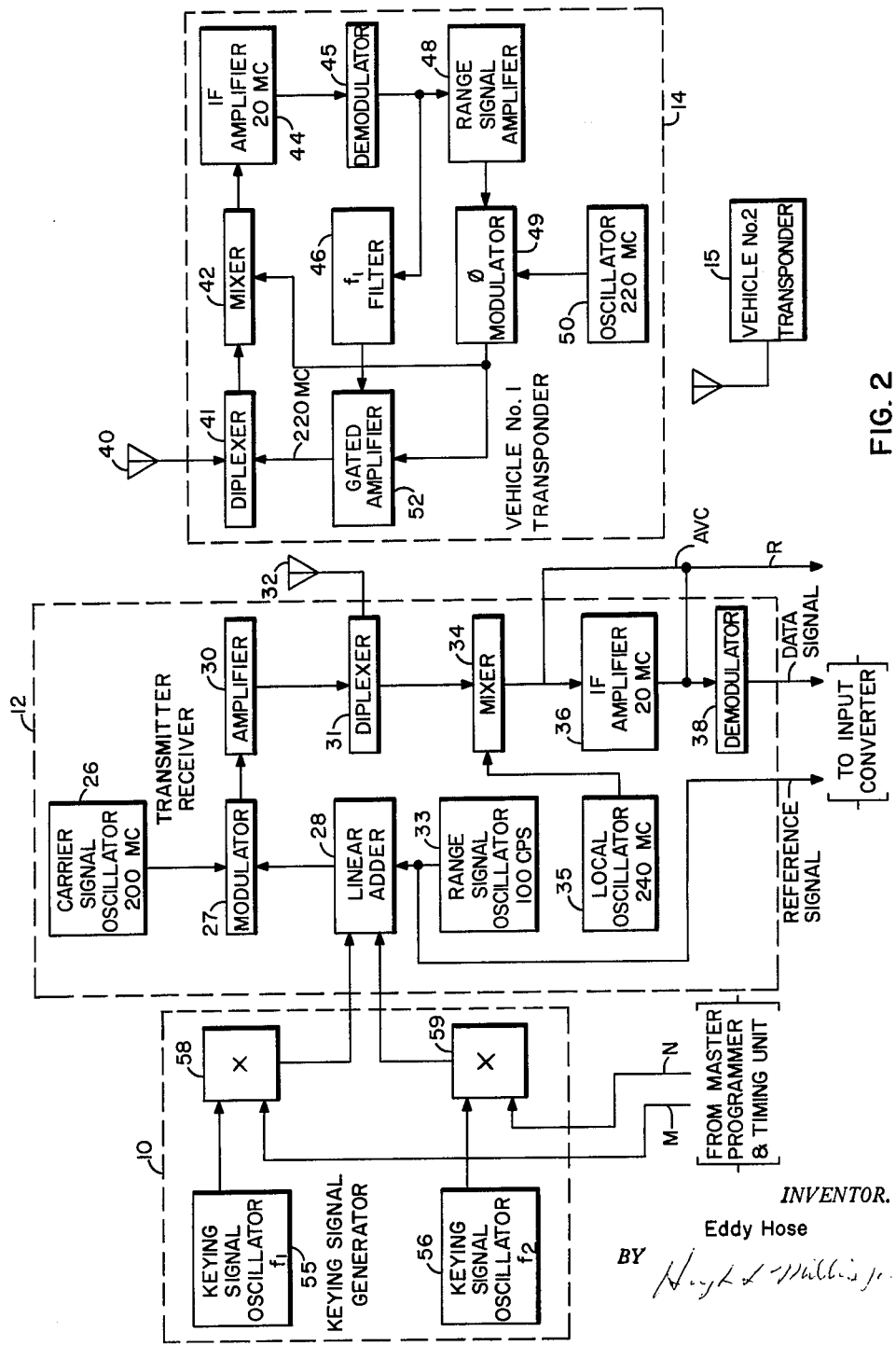
FIGURE 2 is a block diagrammatic representation of the ground station transmitter-receiver unit and a typical transponder unit.

In FIGURE 2, the transmitter-receiver unit 12, the keying signal generator 10 and one of the transponder units 14, taken as representative, are illustrated in more detail. In transmitter-receiver 12, the output signal of a 200 mc. carrier signal oscillator 26 is applied to one input terminal of a modulator 27, the modulator additionally receiving the output signal of a linear added 28 on its other input terminal. The output signal of a 100 c.p.s. range signal oscillator 33 is applied to one input terminal of adder 28 while the adder's two remaining input terminals receive the respective output signals produced by a pair of "and" gating circuits 58 and 59, both within the keying signal generator. The output signal of modulator 27 is amplified by an amplifier 30 and passed through a diplexer 31 to an output antenna 32 for radiation.

The transmitted signal is received on an antenna 40 of transponder 14 and passed through a diplexer 41 to one input terminal of a mixer 42. The ouput signal of mixer 42 is passed through an 20 mc. I-F amplifier 44 and a demodulator 45 to the input terminal of a $f_1$ filter 46 and, additionally, to the input terminal of a range signal amplifier 48. The output signal of amplifier 48 is applied to one input terminal of a phase modulator 49 which receives, on its other input terminal, the 220 mc. output signal produced by an oscillator 50. The output signal from modulator 49 is applied to the other input terminal of mixer 42 and also to the normal input terminal of a gated amplifier 52. The control input terminal of amplifier 52, in turn, receives the output signal from $f_1$ filter 46 while the amplifier's output signal is passed through diplexer 41 to antenna 40 for retransmission to the ground.

The transponder transmitted signal is received by the ground station antenna 32 where it is passed through diplexer 31 to one input terminal of a mixer 34. The 240 mc. output signal of a local oscillator 35 is applied to the other input terminal of mixer 34 and the mixer output signal is passed through a 20 mc. I–F amplifier 36 to a demodulator 38. An AVC signal is taken from the output of amplifier 36 back to its input, as indicated, and is employed later in the data handling portion of the present system as a signal R. The output signal from demodulator 38 represents the range data output signal from this transmitter-receiver unit 12. The output signal of oscillator 33 represents the reference range signal and both it and the data signal are passed to an input converter, shown later detailed in FIGURE 5.

The keying signal generator 10 includes a pair of keying signal oscillators 55 and 56, producing the $f_1$ and $f_2$ keying signals, respectively, which are applied to one input terminal of each of the previously noted "and" gating circuit 58 and 59, respectively. A pair of signals, designated M and N from the programming and timing unit, not here illustrated, are applied to the other input terminal of each of gating circuits 58 and 59, respectively. The output signals of these "and" circuits, as mentioned earlier, are applied as input signals to linear adder 28 within transmitter-receiver 12.

In operation, signals M and N are alternately high, and hence alternately pass the $f_1$ and $f_2$ signals through their associated "and" gates to linear adder 28. Then, the passed $f_1$ and $f_2$ signal, along with the 100 c.p.s. range signal, is modulated on the carrier signal produced by oscillator 26, radiated from antenna 32, and received by both vehicle transponders. Considering transponder 14 specifically, the received signal is mixed with the offset carrier signal produced by oscillator 50 in mixer 42, and the mixing results amplified by I–F amplifier 44 and then demodulated. The 100 cycle range signal component of the demodulated signal is then selectively amplified by range signal amplifier 48 and phase modulated on the output signal of oscillator 50 by modulator 49. It will be observed that the degenerative or negative feedback loop from modulator 49 to mixer 42 acts to minimize phase shifts in the range signal as it passes through the various transponder circuitry and hence preserves the accuracy of its slant range measuring proporties. If the $f_1$ signal appears in the received signal, it will be passed by filter 46 to open gated amplifier 42 with the result that the transponder modulated carrier signal will be passed thereby and retransmitted to the ground. On the other hand if the $f_1$ signal is not present, signifying either a blank interval between keying signal transmissions or a $f_2$ keying signal transmission time, amplifier 52 is not opened and no signal is returned by the transponder.

The second vehicle's transponder is identical to the transponder just described except that its filter, corresponding to filter 48, is tuned to pass the $f_2$ frequency, and thereby operate its transponder during the other or $f_2$ signal sample intervals.

The basic theory of operation of the digital filter units, employed in the system according to the present invention, is best explained in connection with FIGURE 3a. Assume, first of all, that a series of discrete, position measurements have been made of a reasonably uniformily varying input quantity, assumed in the present system to be a slant range measurement to a moving target vehicle. The operation of the filter is such as to build up a first number, $\frac{1}{4}\Sigma e$, in a register 63 representing, in a sense, an averaged, present acceleration and a second number $\frac{1}{16}\Sigma\Sigma e$, in a register 64 representing generally an averaged, present velocity.

Now, the value resulting from each new measurement is placed in a register 66 and concurrently, these with the contents of registers 63 and 64 are added together and the results placed in a register 65 to represent a predicted new measurement. This predicted value is then effectively subtracted from the measured value to form an error number, placed in a register 62, which represents the difference between the predicted and measured values, and hence, the error in the smoothed acceleration and velocity numbers. This error number is then multiplied by ¼ and added to register 63 to form a new $\frac{1}{4}\Sigma e$ value and then, this new value in register 63, is multiplied by ¼ and added to register 64 to form a new $\frac{1}{16} \Sigma\Sigma e$ value in register 64.

Considering again the present system, assuming no input signal noise and that the vehicle being tracked moves with a constant slant range velocity, the values in registers 63 and 64 will be built-up by the reiterative process just described to the point that the measured and predicted values will agree exactly each sample interval, with zero error values resulting. If noise were present, then this filtering technique would serve to smooth or average out the noise component, in a way similar to noise smoothing properties of normal analog integrators. In the same way, rapid accelerations and decelerations of the vehicle will tend to be averaged or filtered with smoothing varying output data resulting from the prediction process employed.

Several comments may be made concerning the smoothing or digital filtering technique employed. Assuming the register 63 and 64 numbers have been built-up to correspond to the vehicle's preformance, and additionally assuming that the vehicle being tracked maintains a reasonably constant slant range velocity value, the additive transfers indicated may be performed in absence of actual measurements and predicted slant range positions acquired of future aircraft positions. This feature, as will be recognized may be of fundamental importance in certain aspects of air-traffic control, for example, collision avoidance and certain types of ground controlled landing operations.

It may also be noted that the use of two registers, with constant multipliers of ¼, for holding the past history velocity and acceleration information, represents only one typical configuration. For example, a different constant multiplying value could be employed, as may be based on specific input tracking characteristics for obtaining better filtering or the servo characteristics. Also, additional registers may be used in order to create higher ordered prediction values, for example, changes of acceleration, etc.

While FIGURE 3a showed an idealized version of the basic filtering technique employed, FIGURE 3b indicates schematically the manner in which this technique is essentially mechanized in the present system. A data and reference comparison circuit 68 receives both data and reference signals and produces UP output clock signals when the data and reference signals are of the same polarity, and DOWN clock signals when they are of opposite polarity. The predicted value is acquired and placed in register 65, by the addition of the contents of registers 63 and 64. Then, the clock signal is counted into this predicted value and, at the first register overflow, a gate 67 is opened, and the UP and DOWN clock signals produced by comparison circuit 68 are passed to the input of error register 62, where they are individually counted in corresponding UP and DOWN directions. A counter 69 acts to count the overflow values of predicted register value 65 and turns off gate 67 after a predetermined count is made of the register 65 overflows.

The FIGURE 3b circuitry operates to effectively shift the phase of the reference signal, applied to comparison circuit 68, an amount corresponding to the predicted value by inhibiting the error count until the predicted value register overflows. This will be made more clear in subsequent figures, particularly FIGURES 5, 6, 7 and 8 in their respective descriptions. Hence, the FIGURE 3b circuitry makes use of the predicted value to shift the phase of the reference signal and the error number is accumulated directly by the counting process. In FIGURE 3a, the actual phase difference between reference and data signals is measured, and the error number obtained by computation, i.e., subtraction. The two techniques, however, as will be apparent, are substantially similar, as the error magnitudes are manipulated in the same way in both instances, the only difference between the two techniques being in the manner of acquiring the initial error value.

Figure 4:
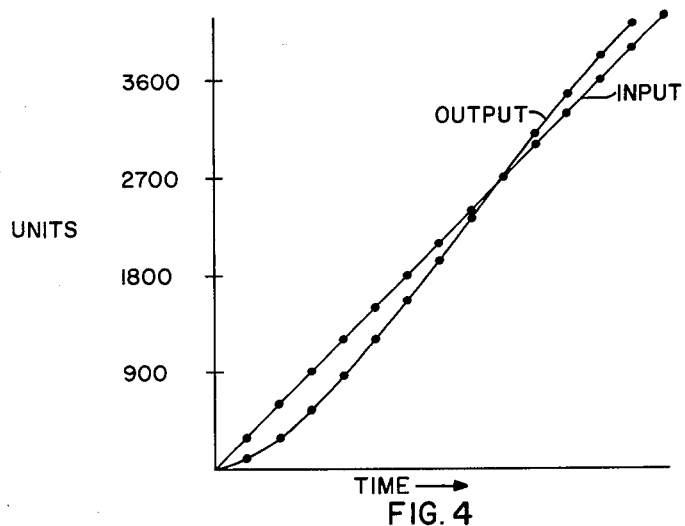
FIGURE 4 shows a typical output response of a digital filtering and prediction unit to a linear input function.

FIGURE 4 shows a representative plot of an input, constant velocity, zero acceleration function starting at an initial value of 0 unit and increasing linearly at a rate of 300 units per sample or iteration. The series of predicted values produced by a digital filter of the FIGURE 3a or 3b type, starting with zero values in its $¼\Sigma e$ and $\frac{1}{16}\Sigma\Sigma e$ registers, is also shown. As indicated, the predicted values, starting at zero, lag the input up to about 2700 units and then over-shoot slightly, giving positive error values. Continuation of the plot would reveal that null is attained in about ten additional cycles.

Figure 5:
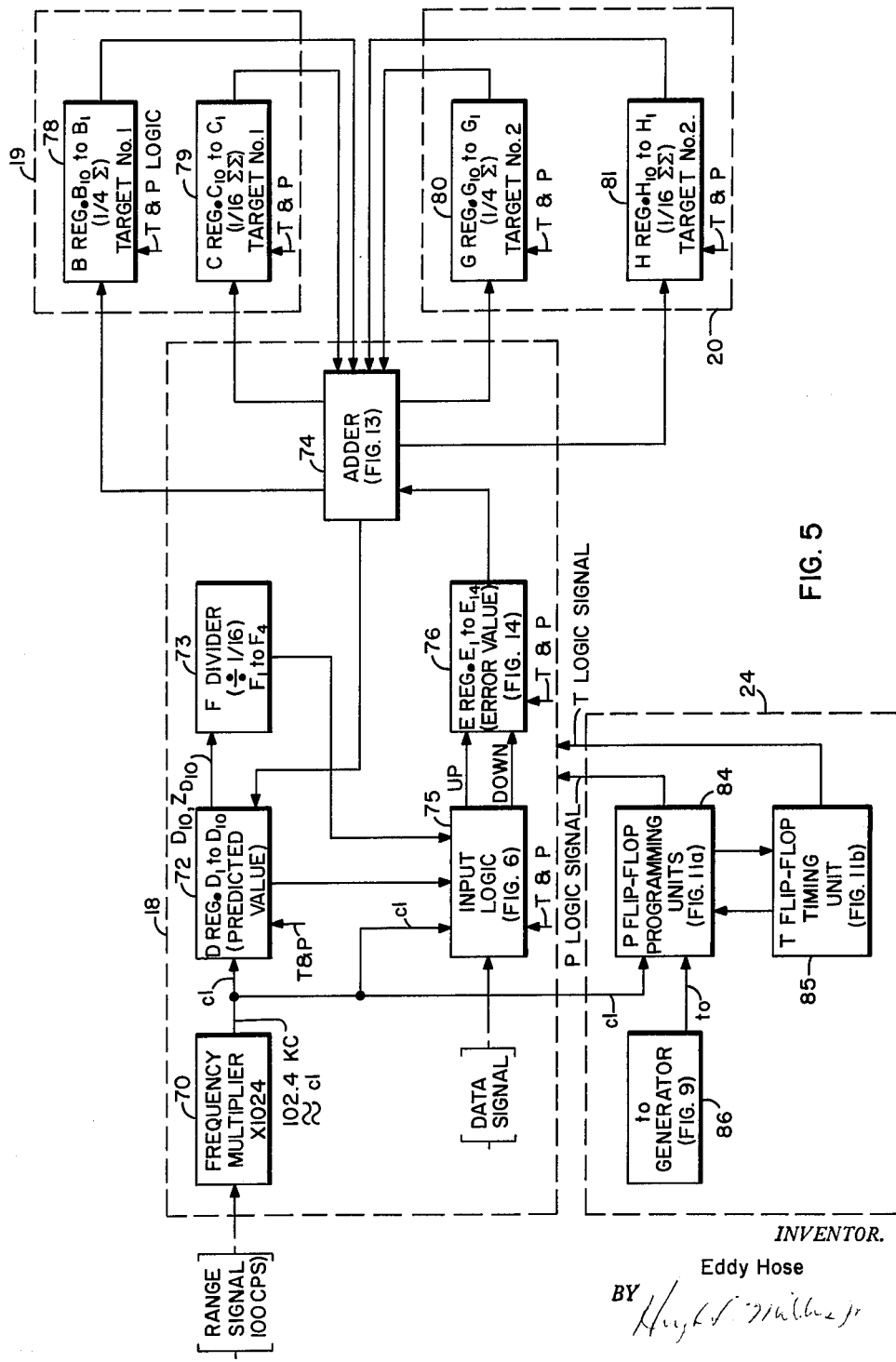
FIGURE 5 is a block diagrammatic representation of the digital filtering and prediction unit applied to the two target tracking system according to the present invention.

Input converter 18, digital filters 19 and 20, and programming and timing unit 24 are illustrated in more detail in FIGURE 5. The 100 c.p.s. range reference signal, generated by oscillator 33 in FIGURE 2, and not again illustrated, is applied to a frequency multiplier 70 within input converter 18, which provides an input signal frequency multiplication of 1024 times, to thereby produce an output signal 102.4 kc. This signal is employed in this and other units, as the basic synchronizing clock signal, termed $cl$ in the logic gating circuitry. This clock signal is applied to one input terminal of a D register 72, generally employed for holding the predicted slant range value for each interrogation cycle, and including 10 flip-flops, not herein specifically shown, but designated $D_1$ thorugh $D_{10}$. A series of so-termed T and P logic signals, produced in a manner described later by programming and timing unit 24, are applied to D register 72 to variously program the D register to count the input clock signal, and to serve as a stepping register whenever the predicted values are ordered stepped serially into it.

Certain D register 72 signals, including the output signals of its final flip-flop stage $D_{10}$, are applied to the input terminals of a F divider register 73 which includes four flip-flops, not specifically shown, designated $F_1$ through $F_4$. F divider 73 acts to effectively divide the overflow counts coming from D register 72, during the intervals the D register is programmed as a counter. The output signals of F divider 73 are applied to an input logic unit 75 as are certain flip-flop signals from D register 72. The F divider is shown in more detail in the following FIGURE 17 and described in connection therewith.

The input logic unit, shown in more detail in the following FIGURE 6 and described in connection therewith, additionally receives the data signal coming from demodulator 38, FIGURE 2, clock signal $cl$, and the T and P logic signals from the programming and timing unit 24. During certain modes of operation, the input logic unit, as described later, furnishes counting signals on respective UP and DOWN conductors which are coupled to an E register 76, having 14 flip-flops, designated $E_1$ to $E_{14}$, and explained in more detail in connection with the following FIGURE 14. E register 76 is programmed by the T and P logic signals to accumulate the error signal, during each interrogation time, by serving as an up-down counter. Then, during other T and P programmed modes, its previously accumulated counts are serially stepped out, in a left-to-right direction, through an $E_6$ state, into an adder 74. Adder 74, shown in more detail in the following FIGURE 13 and described in connection therewith, performs various additions required in the digital filtering process.

Digital filters 19 and 20 are similar to each other and each includes two identical registers. In particular, filter 19 includes a B register 78 having 10 flip-flops, designated, in order, $B_{10}$ to $B_1$. The $B_{10}$ and $B_1$ flip-flops store the least and most significant digits, respectively, of $¼\Sigma e$. The other, a C register 79 includes 10 flip-flops, designated $C_{10}$ through $C_1$, which store the most and least significant digits, respectively, of the $\frac{1}{16}\Sigma\Sigma e$ value portion of the first vehicle slant range. Both B and C registers are programmed, at various times, to be stepped in a left-to-right direction, that is, out of the least significant flip-flop stage, $B_1$ or $C_1$ into adder 74 and, in turn, receive new digits from the adder but stepped into their most significant digit flip-flop state, $B_{10}$ or $C_{10}$.

Digital filter 20, for the second vehicle, includes a G flip-flop register 80 holding the $\frac{1}{4}\Sigma e$ value and a H flip-flop register holding the $\frac{1}{16}\Sigma\Sigma e$ value. Registers 80 and 81 are similar to registers 78 and 79 in filter 19, except that they are programmed by the T and P logic signals to operate at different intervals therefrom. Register B, taken as an example of these similar registers, is shown in more detail in FIGURE 16, and described in connection therewith.

Programming and timing unit 24 includes a P flip-flop programming unit 84 which is shown in more detail in FIGURE 11a and whose operation is explained in connection with FIGURE 12. The clock signal $cl$ from multiplier 70 is applied to programming unit 84 which also receives a $t_0$ signal from a $t_0$ generating unit 86, shown later in FIGURE 9. The P logic signals are produced by this unit 84 while the T logic signals are produced by a T flip-flop timing unit 85, shown in more detail later in FIGURE 11b. These T and P flip-flop units are in signal communication with each other, as generally indicated.

Although the operation of FIGURE 5 circuitry will be made clear after subsequent detailed discussions and descriptions of the various circuits involved, such as input logic unit 75, adder 74, the P and T units, and different flip-flop registers, a brief summary of its step by step operation is given below based on the series of steps performed by the circuitry for a complete data sample which includes the interrogation of both target vehicles. It should be first noted that the $t_0$ generator 86 produces a series of spaced, periodic signals and each pair of consecutive signals orders consecutive interrogation cycles of the pair of vehicle transponders.

(a) At the appearance of the first $t_0$ signal, signifying the first vehicle interrogation cycle, the contents of the B and C registers of digital filter 19 are added by adder 74 and passed into the D register.

(b) Upon the appearance of the R signal from the AVC circuit of the receiver, signifying that the data signal is being returned from the transponder, the input conversion operation is performed by the input converter in which an error number is accumulated in the E register whose magnitude corresponds to the difference between the actually measured slant range value and the predicted slant range found in the D register.

(c) The E register error number is multiplied by $\frac{1}{4}$ and added by adder 74 to the previous contents of B register 78, the results of the addition being passed back into the B register 78 for storage.

(d) The contents of the B register are multiplied by $\frac{1}{4}$, and added to the contents of the C register through adder 74, the results of the addition being passed back in the C register.

This concludes a series of operations constituting a first vehicle measurement cycle.

(e) Upon appearance of the next $t_0$ signal from $t_0$ generator 86, signifying the beginning of the second vehicle transponder interrogation, the contents of the G and H registers, 80 and 81, respectively, are added by adder 74 and the results, representing the new predicted second vehicle slant range value, are passed into D register 72.

(f) Following the appearance of the receiver AVC R signal, an input conversion is performed where, again, a number is built up in the E register to represent the error between the measured and predicted values of this slant range reading.

(g) The contents of the E register are multiplied by $\frac{1}{4}$ and added by adder 74 to the previous contents of the G register, the results of the addition being passed back into the G register to represent the new $\frac{1}{4}\Sigma e$ number.

(h) The new contents of the G register are multiplied by $\frac{1}{4}$ and added to the contents of H through adder 74, the results being returned to the H register. This final step represents the completion of the second vehicle transponder interrogation cycle. The next appearance of the $t_0$ signal causes the cycle, starting in (a) above, to be repeated.

FIGURE 6 illustrates the input logic unit 75 in detail and particularly shows its relationship with the D and F registers, the input data signals and its production of UP and DOWN count signals for the E register. First of all, only the final flip-flop $D_{10}$ of the D register is illustrated, and it includes two input terminals designated $S_{D_{10}}$ and $Z_{D_{10}}$ representing, set and zero, respectively, and two output terminals, $D_{10}$ and $D'_{10}$. In operation, a signal applied to the set or $S_{D_{10}}$ input terminal acts to trigger the flip-flop to its "set," "one," "on" etc., conduction state in which the $D_{10}$ output signal is "set," "on," "one," etc. On the other hand, a triggering signal applied to the zero or $Z_{D_{10}}$ terminal causes the flip-flop to reverse its conduction state to an "off," "zero," "reset" condition, referenced to the $D_{10}$ output terminal. This nomenclature, specifically applied to this $D_{10}$ flip-flop, is employed for the other flip-flops in the system, where each flip-flop is given the same alphabetical designation as its associated register, followed by a subscript denoting its particular place in the register as determined by the significant bit value generally held by it. In particular, the least significant flip-flop is denoted by a "1" subscript, with successively higher significant digit flip-flops being designated by "2," "3," etc., subscripts. In the same way, the "set," "on," etc., output signal of each flip-flop is given the same designation as the flip-flop while it is complementary "reset," "off" output signal is represented by the flip-flop designation primed.

A pair of "and" gating circuits 90 and 91 are connected to the $S_{D_{10}}$ and $Z_{D_{10}}$ terminals, respectively, and the connections to these gating circuits will be shown later in FIGURE 15b where flip-flop $D_{10}$ is shown in more detail. Flip-flop $D_{10}$, as well as the other flip-flops in the present system, is cross-coupled, that is, its set and zero output signals are coupled to the "and" circuits connected to its zero and set input terminals, respectively. In particular, the $D_{10}$ output signal is applied to one input terminal of the zeroing input gate 91, while signal $D'_{10}$ is applied to one input terminal of its S or set input gate 90.

The $D_{10}$ output signal, and the gating circuit 91 output signal, designated $Z_{D_{10}}$ are applied, along with the clock signal $cl$, to the three input terminals of an "and" gate 93, in turn, connected to the $S_Q$ input terminal of a Q flip-flop. In the same way, the "and" product of the $F_4$ signal taken from the final $F_4$ flip-flop in F divider 73 and the Z or zero input proposition to $F_4$, designated $Z_{F_4}$, is applied to one input terminal of another "and" gating circuit 94. The clock signal $cl$ is applied to the other input terminal of "and" gate 94 while its output terminal is coupled to the zero or $Z_Q$ input terminal of the Q flip-flop.

The data input signal, in the form of a sine wave, is passed through squaring amplifier 98 to form a designated I output logical signal. Signal I is then passed through an inverter 99 to form an I' complementary signal. Signals $D_{10}$ and I are applied to the two input terminals of an "and" gating circuit 102 whose output signal is applied to one input terminal of an "or" circuit 104. Signals I' and $D'_{10}$ are applied to the two input terminals of an "and" circuit 103 whose output is applied to the other input of "or" circuit 104. Signals I and $D'_{10}$ are applied to another "and" gate 105. Signals I' and $D_{10}$ are applied to the two input terminals of an "and" circuit 106 while the output signals of "and" circuits 105 and 106 are coupled to the two input terminals of an "or" gating circuit 107 whose output signal, in turn, is applied to one input terminal of an "and" gate 110. The output signal of "or" circuit 104 is applied to one input terminal of an "and" circuit 109 while signals $cl$ and Q are applied to the remaining two input terminals of each of "and" circuits 109 and 110. Finally, the output signals of "and" gates 109 and 110, representing the UP and DOWN counting signals, respectively, of the input logic unit are applied to the correspondingly designated E register 76 input terminals.

Consider now the operation of the input converter unit in deriving an error number for, by way of example, a first vehicle interrogation cycle. First of all, the predicted slant range value, obtained by adding the B and C register contents, is inserted into the D register. Following the R signal appearance, the 102.4 kc. clock signal is added to the D register contents and whenever its value passes all ones and overflows, the Q flip-flop is turned on. In particular, when the D register value is one, that is, all of its individual flip-flops are simultaneously one, the next clock pulse acts to zero all flip-flops to their "0" state. This one value condition is reflected as the simultaneous appearance of the $D_{10}$ proposition and a triggering signal order to the zero terminal, or ($Z_{D_{10}}$), as is mechanized by gate 93 to turn the Q flip-flop "on." Simultaneously with this Q flip-flop setting operation, each of the D register flip-flops go from "1" to "0" and the counting process continues.

Whenever Q is turned on, "and" circuits 109 and 110 are opened to thereby pass UP and DOWN signals, generated in a manner to be described shortly, into E register 76, programmed during this conversion subcycle as an up and down counter. The four stage F counter 73 counts the cycles made by the $D_{10}$ flip-flop and will overflow, that is, all of its flip-flops will be "1" and simultaneously go back to "0" after 16 complete $D_{10}$ flip-flop cycles representing, in turn, 16 overflows of the D counter as it counts the clock signal. The F counter overflow is employed to turn off the Q flip-flop and thereby halt the E register counting process. Additionally, the P flip-flop program is modified, as explained later, to initiate a new subcycle of operation.

FIGURE 7 presents a set of typical waveforms for further illustrating the operation of this input converter. The subcycle begins at $t_1$, at which time the count down of the predicted value in the D register is started. At $t_2$, the first overflow occurs and the E register count is started. Finally, at $t_3$, after 16 cycles of D register overflow, the counting is halted at which time the error signal remains in the E register.

The frequency of the $D_{10}$ flip-flop output signal is 102,400/1024 or 100 c.p.s., since the D register employs 10 flip-flops and thereby counts down the applied clock signal by a factor of $2^{10}$ or 1024. Since the clock signal is synchronized with the reference signal, the $D_{10}$ flip-flop signal represents the reference signal but shifted in phase an amount corresponding to the initial, predicted value stepped into it. This predicted value, of course, represents the predicted phase shift of the data signal relative to the reference signal. This predicted value, in turn, delays the initial overflow of the D register by an amount corresponding to its magnitude.

The rules governing the relationship between the shifted reference signal $D_{10}$ and the complementary input data signals I and I' relative to the up and down counting of E register are such that if both are simultaneously of the same value, either 1 or 0, the clock signal is counted up by E. On the other hand, if both are of opposite value, the clock signal is counted down in the E register. Accordingly, the Boolean expression defining the "and" and "or" gating circuits 102 through 107 in FIGURE 6 are as follows:

$$UP = (D_{10}I + D_{10}'I')Q \ cl \quad (6-1)$$

$$DOWN = (D_{10}'I + D_{10}I')Q \ cl \quad (6-2)$$

It will be appreciated that the connections shown in FIGURE 6 and described in detail earlier, represent an exact mechanization of the equations given above.

Considering again the typical waveforms shown in FIGURE 7, waveform 120 represents a data signal which lags the predicted value shifted reference signal by 90°. This 90° lagging signal case represents the system null condition in which a zero-valued error signal is built up within E register 76. This is true since equal intervals of opposite and same D and I values occur which, in turn, cause equal numbers of up and down counts being applied to counter E. It is this data-reference signal phase relationship which is nulled by the system and this inherent 90° difference between the range and reference signals may be compensated for in several ways. One technique would involve a simple additive correction to the output data, either in an output register or during a data reduction stage to account for the fact that the 90° difference between the data and reference signals at null does not represent a time distance separation between stations. Since the 100 c.p.s. range signal wavelength corresponds to approximately 1,860 miles, or a maximum vehicle slant range of 930 miles to account for the two way signal travel required, the 90° null separation would correspond to ¼ of 930 or 232.5 miles correction.

As an alternative correction technique, the reference signal may be given a 90° phase shift through either a phase shifting network or resolver before being applied to the input converter. In this case, the resulting slant range output values would correspond exactly to the slant range measurement. According to another technique, a constant value, corresponding to the amount of correction required, may be added to the predicted value in the D register just prior to the conversion cycle.

It will be understood that the 90° phase difference at null in the present system corresponds exactly to the action occurring in phase discriminators where null or zero output signal is obtained only when a 90° phase difference occurs between two applied input signals.

Waveform 121 in FIGURE 7 represents the case when the data and shifted reference signals are in phase coincidence with each other. Since the signals are always simultaneously either 1 or 0, only UP signals are applied to the E counter with the result that the counter will accumulate a maximum positive count or $2^{14}$, as derived from $2^{10}$ counts made for each D register overflow and $2^4$ or 16 counts made by the F counter. In the same way, waveform 122 illustrates the case where the data signal either leads or lags, by 180°, the phase shifted reference signal. Here, since their simultaneous values are always different, only negative or down counts are applied to counter 76 with a $-2^{14}$ value being accumulated thereby. Waveform 123 indicates a 90° leading data signal which produces a zero-valued error number similar to the 90° lagging case.

Figure 8:
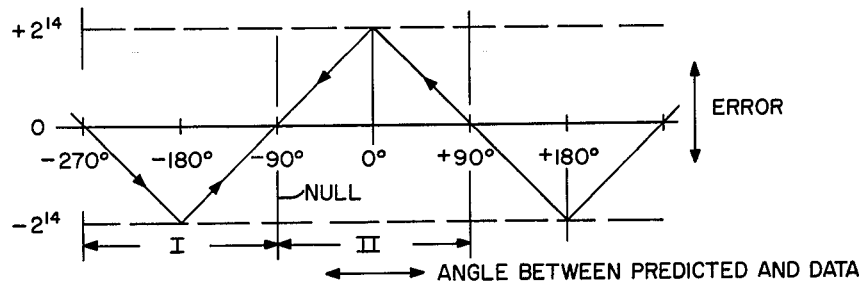
FIGURE 8 is a diagram illustrating the servoing operation of the digital system.

FIGURE 8 shows a continuous plot of error counts accumulated in the E register for varying amounts of phase lead and lag of the data signal from the shifted reference signal. As indicated, the ±90° cases both result in zero error, while the 0° and —180° cases yield $+2^{14}$ and $-2^{14}$ counts, respectively in turn, representing maximum positive and negative error counts.

FIGURE 8 also indicates how the system operates, through the sign of the error number magnitude, to always shift the predicted value such that the data signal differs from it by —90°. In region I, between —90° and —270°, the accumulated error values are negative which means that the predicted value was too high in value and hence did not shift the reference signal a sufficient amount, that is, the D register overflowed too soon. Stated differently, from FIGURE 7, the $D_{10}$ signal must be effectively moved in a right hand direction, relative to the —180° data waveform 122, and this may be accomplished by employing a smaller predicted value which would require a greater number of up-counts before overflow. Accordingly, the negative error number produced in this case, in being added to the digital filter numbers, acts to effectively decrease the magnitude of the predicted value. This decrease in the predicted value will, during the next sample interval, as noted, produce a greater reference signal shift, as is desired. Hence, the negative error values in this region I of FIGURE 8 effectively shift the predicted value toward the −90° null point, in the left-to-right direction, as indicated by the arrows in the figure.

On the other hand, in region II, between −90° and +90°, the accumulated error numbers are positive and hence denote that the predicted value was too high in value and therefore caused too short a reference signal phase shift. Accordingly, the positive error number, in being added to $¼Σe$, etc., causes an increase in magnitude of the predicted value during the next sample interval and hence produces the desired smaller phase shift in the reference signal. This region II type of action causes a right-to-left movement of the reference and data phase difference toward the −90° null point.

Figure 9:
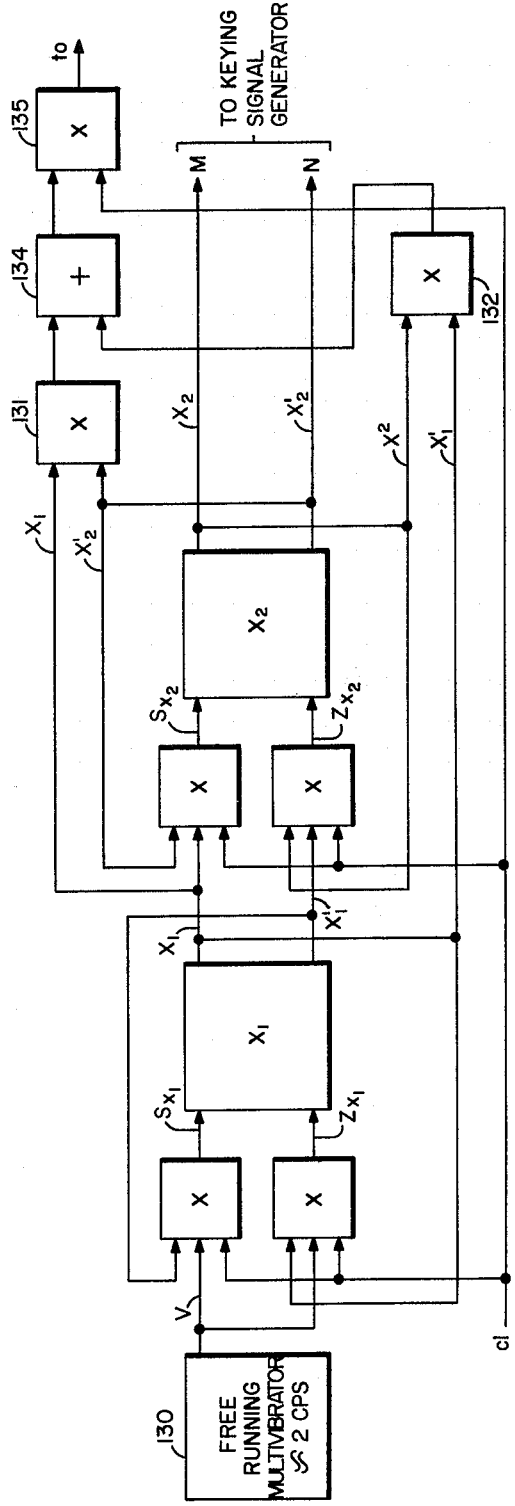
FIGURE 9 is a block diagrammatic representation of the $t_0$ generator.

The $t_0$ signal generator 86, from FIGURE 5, is illustrated in FIGURE 9. A free running multi-vibrator circuit 130 produces an output signal V which is applied to the input gating circuitry of a flip-flop $X_1$, connected to count the cycles in signal V. In particular, the $X_1$ flip-flop input gating circuitry is defined by the following Boolean expressions:

$$S_{X_1} = VX_1' \, cl \quad (9-1)$$
$$Z_{X_1} = VX_1 cl \quad (9-2)$$

Another flip-flop $X_2$ is connected as a single stage stepping register to the $X_1$ flip-flop and the expressions defining its input gating relationships are:

$$S_{X_2} = X_1 X_2' \, cl \quad (9-3)$$
$$Z_{X_2} = X_1' X_2 \, cl \quad (9-4)$$

The output signals $X_2$ and $X_2'$ of the $X_2$ flip-flop represent the M and N signals, respectively, applied to the keying signal generator 10 as shown earlier in FIGURE 2. The $X_1$ and $X_2'$ signals are applied to the two input terminals of an "and" gate 131 while the $X_2$ and $X_1'$ signals are applied to the two input terminals of another "and" gate 132. The output signals from "and" circuits 131 and 132 are applied to the two input terminals of an "or" circuit 134 whose output signal, in turn, is applied with clock signal $cl$ to an "and" gate 135 whose output signal, in turn, constitutes the $t_0$ output signal of this generator 86. The equation defining these $t_0$ gating circuitry is:

$$t_0 = (X_1 X_2' + X_1' X_2) \, cl \quad (9-5)$$

Figure 10:
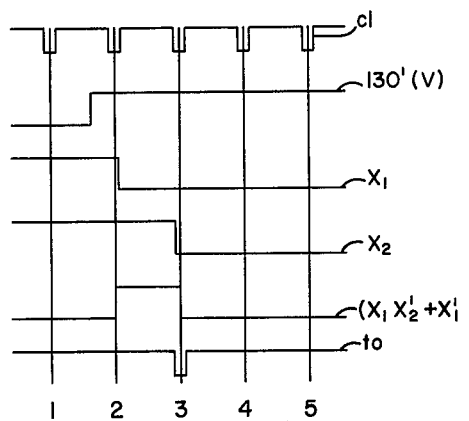
FIGURE 10 shows a group of illustrative waveforms appearing within the $t_0$ generator.

The operation of the $t_0$ generator is best understood by reference to FIGURE 10 which shows a group of typical circuit waveforms. First of all, the operation of free running multi-vibrator circuit 130 is not phase synchronized with the basic computer system clock and hence its output signal is independent from the clock $cl$. Accordingly, it may trigger at any time between or during the clock signal appearances and the $t_0$ circuitry must allow for this random triggering and yet produce only a single $t_0$ output pulse for each multi-vibrator triggering.

The waveform 130', taken as an example, represents the multi-vibrator 130 output signal V and, as shown, switches from its "low" to "high" voltage level corresponding as defined, to 0 and 1, respectively, in between designated first and second clock pulses. The next appearing or second clock pulse, reverses the conduction state of the $X_1$ flip-flop, such that its output signal $X_1$ goes from its high to low voltage level, since it is connected to the multi-vibrator as a single stage binary counter. In the same way, at the third clock interval 3, the $X_2$ flip-flop is triggered from its high to low voltage level since it, as noted earlier, is connected as a single bit stepping register to the $X_1$ flip-flop. The $X_1$ and $X_2$ flip-flops will therefore exhibit different conduction states between the second and third designated clock intervals.

The gating circuits 131, 132, 134 and 135 are connected to produce a high voltage level whenever the $X_1$ and $X_2$ flip-flops are at different conduction states, as is the case just described. Hence, a $t_0$ output signal is passed by gating 135 at this third clock interval.

The circuitry illustrated converts each single multi-vibrator cycle to a single output $t_0$ clock pulse, regardless of when the multi-vibrator triggers relative to the clock signal appearance. For example, if the multi-vibrator triggers just prior to a clock interval, the $X_1$ flip-flop may or may not be triggered by the next clock pulse appearing shortly thereafter, as determined by its input gating rise times and other characteristics. If triggering does occur, then the operation proceeds as shown with a $t_0$ signal being produced at the next following clock interval. On the other hand, if the flip-flop should not be triggered at that particular interval, then it will be triggered by the next following clock signal with a $t_0$ output signal being subsequently produced at the following clock signal. Hence, under no circumstances can a $t_0$ signal fail to be produced when the multi-vibrator signal V goes from its low to high voltage level, nor, on the other hand, can more than a single $t_0$ signal be produced.

Figure 11A:
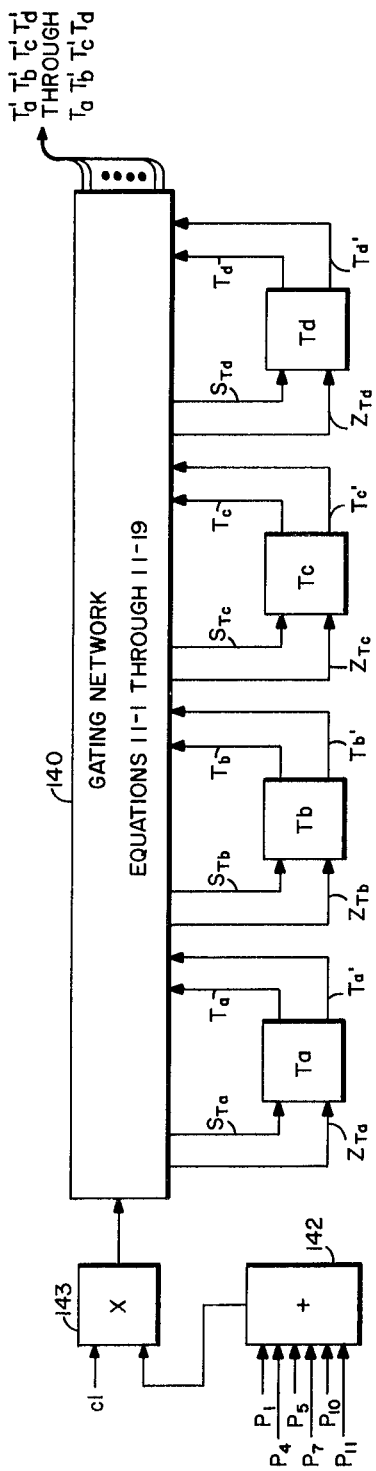
FIGURES 11a and 11b illustrate the general arrangement of the T and P flip-flop timing and programming units, respectively.

FIGURE 11a shows the series of T flip-flops in the T flip-flop timing unit 85 from FIGURE 5, along with their associated input gating network 140, indicated schematically and defined by a series of Boolean equations to be given shortly. This timing unit includes four T flip-flops, designated $T_a$, $T_b$, $T_c$, and $T_d$, each receiving triggering signals on respective set and zero input terminals and their respective pair of complementary output signals being applied to gating network 140. This timing unit is actuated during certain specified subcycles of the system's operation as determined by the P flip-flop programming unit 84, in a manner described in detail later. In particular, the P flip-flop unit produces twelve different programmed subcycles of operation, $P_1$ through $P_{12}$, six for each complete target interrogation cycle. Of these programmed subcycles, this timing unit is activated during the $P_1$, $P_4$, $P_5$, $P_7$, $P_{10}$ and $P_{11}$ program states, as applied to "or" circuit 142 whose output signal in detail goes to one input terminal of an "and" gate 143. The clock signal $cl$ is applied to the other input of "and" gate 143 and is passed, during each of the noted P intervals, to gating network 140 to thereby produce a counting cycle.

The T flip-flops are arranged to count from 0 to 9 and then reset back to their initial or zero count. The clock intervals thus counted are designated $T_1$ through $T_{10}$, and are represented by the following conduction state combinations of the $T_a$ through $T_d$ flip-flops:

$$T_1 = T_a' T_b' T_c' T_d' \quad (11-1)$$
$$T_2 = T_a' T_b' T_c' T_d \quad (11-2)$$
$$T_3 = T_a' T_b' T_c T_d' \quad (11-3)$$
$$T_4 = T_a' T_b' T_c T_d \quad (11-4)$$
$$T_5 = T_a' T_b T_c' T_d' \quad (11-5)$$
$$T_6 = T_a' T_b T_c' T_d \quad (11-6)$$
$$T_7 = T_a' T_b T_c T_d' \quad (11-7)$$
$$T_8 = T_a' T_b T_c T_d \quad (11-8)$$
$$T_9 = T_a T_b' T_c' T_d' \quad (11-9)$$
$$T_{10} = T_a T_b' T_c' T_d \quad (11-10)$$

Gating network 140 interconnects these T flip-flops to produce the above counting sequence. The Boolean equations defining the mechanization of network 140 are:

$$S_{T_d} = T_d' \, cl \quad (11-12)$$
$$Z_{T_d} = T_d \, cl \quad (11-13)$$
$$S_{T_c} = T_a' T_d T_c' cl \quad (11-14)$$
$$Z_{T_c} = T_a' T_d T_c \, cl \quad (11-15)$$
$$S_{T_b} = T_a' T_c T_d T_b' \, cl \quad (11-16)$$
$$Z_{T_b} = T_a' T_c T_d T_b \, cl \quad (11-17)$$
$$S_{T_a} = T_b T_c T_d T_a' \, cl \quad (11-18)$$
$$Z_{T_a} = T_b' T_c' T_d T_a \, cl \quad (11-19)$$

As stated earlier, successive clock signals cause the T flip-flop series to count from $T_1$ through $T_{10}$ and then reset back to and the $T_1$ or $T_a' T_b' T_c' T_d'$ conduction state combination. It will be noted that the ten counts produced by the T flip-flop series during each counting operation corresponds to the 10 bit or digit length of each of the B, C, G and H registers.

Figure 11B:
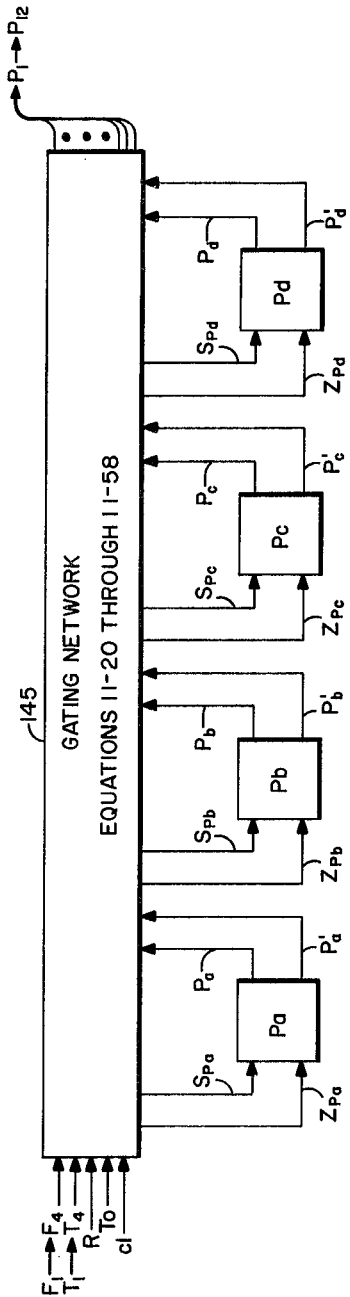

The series of P flip-flops and its associated gating network 145, with input and output signals, are illustrated in FIGURE 11b. The P flip-flops as noted earlier, are triggered through twelve different conduction state combinations which, in turn, order twelve respective subcycles of systems operation. FIGURE 11b should be considered concurrently with FIGURE 12, where the $P_1$ through $P_{12}$ subcycles are listed below in terms of the P flip-flop combinations:

$$P_1 = P_a'P_b'P_c'P_d' \quad (11\text{-}20)$$
$$P_2 = P_a'P_b'P_c'P_d \quad (11\text{-}21)$$
$$P_3 = P_a'P_b'P_cP_d' \quad (11\text{-}22)$$
$$P_4 = P_a'P_b'P_cP_d \quad (11\text{-}23)$$
$$P_5 = P_a'P_bP_c'P_d' \quad (11\text{-}24)$$
$$P_6 = P_a'P_bP_c'P_d \quad (11\text{-}25)$$
$$P_7 = P_a'P_bP_cP_d' \quad (11\text{-}26)$$
$$P_8 = P_a'P_bP_cP_d \quad (11\text{-}27)$$
$$P_9 = P_aP_b'P_c'P_d' \quad (11\text{-}28)$$
$$P_{10} = P_aP_b'P_c'P_d \quad (11\text{-}29)$$
$$P_{11} = P_aP_b'P_cP_d' \quad (11\text{-}30)$$
$$P_{12} = P_aP_b'P_cP_d \quad (11\text{-}31)$$

Figure 12:
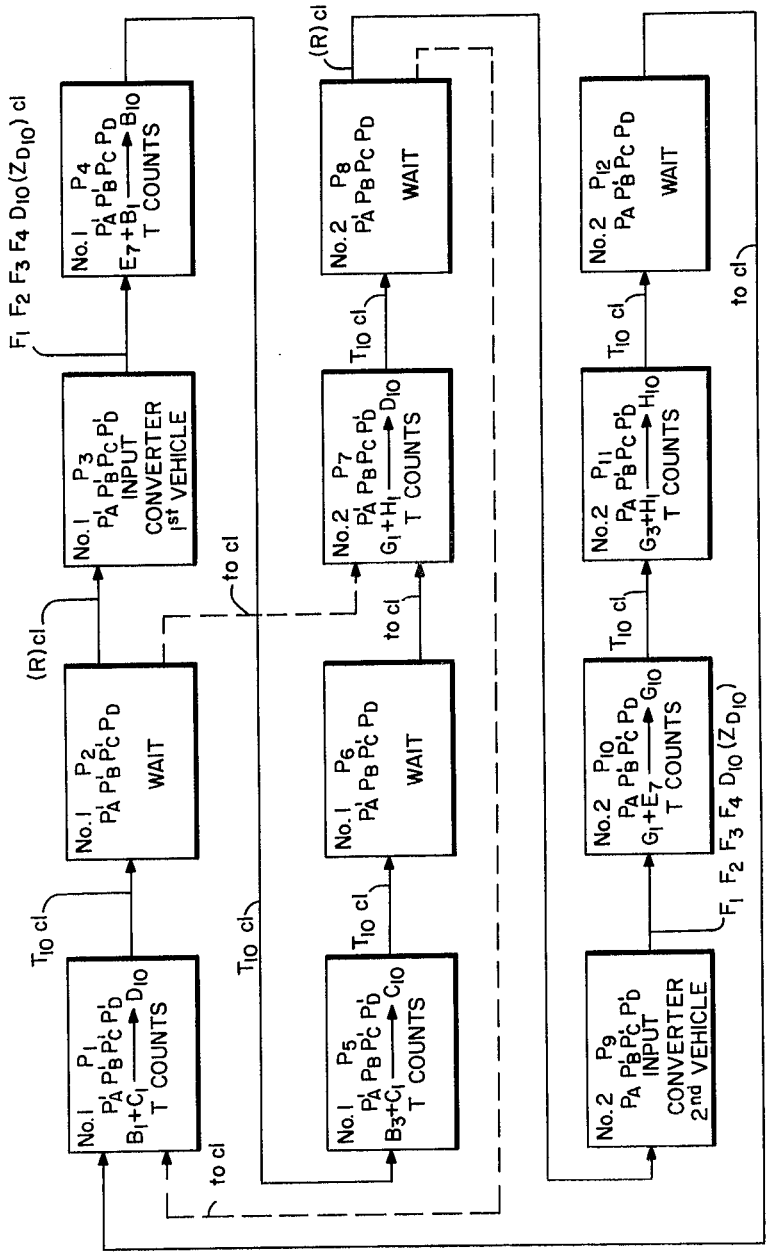
FIGURE 12 is a sequential switching diagram of the conduction state combinations in the P flip-flop programming unit.

FIGURE 12 represents a programming diagram of the $P_1$ through $P_{12}$ intervals defined by the series of P flip-flop state combinations. In the diagram, the $P_1$ through $P_6$ programs order a first vehicle interrogation cycle while the $P_7$ through $P_{12}$ programs order the second vehicle's interrogation. Each program block includes the particular P flip-flop conduction state combination and the operation ordered by that particular program in the remaining circuitry. In addition, the arrows between the clocks, indicating changes of the program, are designated with the particular logic signals ordering the program change.

The operations performed during these $P_1$ through $P_{12}$ programmed intervals are next described along with the Boolean equations which define the mechanization of gating network 145.

(1) $P_1$ ($P_a'P_b'P_c'P_d'$) This interval is 10 clock intervals long, orders the T counter to count, and is ended by the T flip-flop counter reset operation. During this interval, the B and C register values are added by adder 74 and their sum passed into the D register in a right-to-left or least significant digit first direction. The T counter reset is signified by $T_{10}$ cl, where as noted earlier, $$T_{10} = T_aT_b'T_c'T_d$$

causes the next or $P_2$ program to be entered. The equations of this program change are:

$$S_{P_d} = P_a'P_b'P_c'P_d'(T_{10}) \, cl \quad (11\text{-}32)$$

(2) $P_2$ ($P_a'P_b'P_c'P_d$) This programmed sub-interval is a wait interval in which nothing is done by this digital portion of the system. The program is switched to the next or $P_3$ program upon the appearance of signal R from the avc loop in the receiver signifying the appearance of a return signal from the interrogated transponder. The equations for this program change are:

$$S_{P_c} = P_a'P_b'P_c'P_dR \, cl \quad (11\text{-}33)$$
$$Z_{P_d} = P_a'P_b'P_c'P_dR \, cl \quad (11\text{-}34)$$

As noted later in detail, in the event no transponder return signal is detected, this $P_2$ program is switched to program $P_7$ by the $t_0$ signal.

(3) $P_3$ ($P_a'P_b'P_cP_d'$) During this interval, the input conversion cycle, based on a data signal returned by the first vehicle, is performed. The end of the conversion interval is signified by all stages of the F counter being one and an additional triggering signal being applied to it from the D register, the overall expression being $$F_1F_2F_3F_4D_{10}(Z_{D_{10}}) \, cl$$

At this time, the $P_4$ program is ordered in accordance with the below equations.

$$S_{P_d} = P_a'P_b'P_cP_d')(F_1F_2F_3F_4)(Z_{D_{10}})D_{10} \, cl \quad (11\text{-}35)$$

(4) $P_4$ ($P_a'P_b'P_cP_d$) The length of this interval is controlled by the T counter as it performs its normal counting cycle. The error number in E is divided by 64 during this program and the resulting quotient added with the B register contents, the results being passed back into the B register. This division by 64 includes a scale factor of 16, corresponding to the 16 cycles of reference signal counting made by the F counter, and the ¼ multiplication factor required in the digital filtering process prior to its addition to the ¼Σe number. This division is accomplished by stepping the E register contents out of the $E_7$, or seventh flip-flop, of the chain, which represents a division of its contents relative to the B register contents, of $2^{-6}$ or $\frac{1}{64}$. The sign digit, appearing in $E_{14}$, is propagated down the register during the stepping operation and hence appears in $E_6$ during the ninth and tenth clock intervals, in a manner described later. This characteristic is needed for preserving the sign of the error number during the addition.

This $P_4$ interval is ended, as noted earlier, by the $T_{10}$ count, and is switched to $P_5$ in accordance with the following equations:

$$S_{P_b} = P_a'P_b'P_cP_dT_{10} \, cl \quad (11\text{-}36)$$
$$Z_{P_c} = P_a'P_b'P_cP_dT_{10} \, cl \quad (11\text{-}37)$$
$$Z_{P_d} = P_a'P_b'P_cP_dT_{10} \, cl \quad (11\text{-}38)$$

(5) $P_5$ ($P_a'P_bP_c'P_d'$) During this interval, the new contents of the B register are divided by four and added to the C register contents, the sum being passed back into the C register for storage. The division by four is accomplished by stepping the B number out of the third or $B_3$ flip-flop and adding the stepping results to the C register contents. The length of program is again determined by T counter overflow at which time the next $P_6$ program is ordered in accordance with the following equations:

$$S_{P_d} = P_a'P_bP_c'P_d'T_{10} \, cl \quad (11\text{-}39)$$

(6) $P_6$ ($P_a'P_bP_c'P_d$) The preceding $P_5$ program completed the interrogation cycle of the first vehicle transponder and nothing further is done by the system until the next appearance of the $t_0$ signal which signifies that the next or second vehicle interrogation cycle is to begin. At this time, the $P_7$ program is ordered in accordance with the following equations:

$$S_{P_c} = P_a'P_bP_c'P_dt_0 \, cl \quad (11\text{-}40)$$
$$Z_{P_d} = P_a'P_bP_c'P_dt_0 \, cl \quad (11\text{-}41)$$

As noted previously, program $P_2$ ($P_a'P_b'P_c'P_d$) is also switched to $P_7$ at $t_0$ in the event that no R signal, representing a first vehicle return signal, has occurred previously. The equations effecting this transfer are:

$$S_{P_b} = P_a'P_c'P_dP_b't_0 \, cl \quad (11\text{-}42)$$
$$S_{P_c} = P_a'P_b'P_dP_c't_0 \, cl \quad (11\text{-}43)$$
$$Z_{P_d} = P_a'P_b'P_c'P_dt_0 \, cl \quad (11\text{-}44)$$

(7) $P_7$ ($P_a'P_bP_cP_d'$) This program corresponds to the $P_1$ program previously noted, except that the second vehicle is interrogated. Here, the G and H register values are added and passed into the D register. At the completion of this addition signified by $T_{10}$, the next program $P_8$ is ordered in accordance with the following equation:

$$S_{P_d} = P_a'P_bP_cP_d'T_{10} \, cl \quad (11\text{-}45)$$

(8) $P_8$ ($P_a'P_bP_cP_d$) This programmed interval is another wait one similar to $P_2$, in which the digital circuitry remains idle until the appearance of the R signal from the avc loop, signifying receipt of range data. In the event that no R signal appears, the next following $t_0$ signal switches this program to $P_1$, is described later. This R signal orders the next or $P_9$ program in accordance with the following equations:

$$S_{P_a} = P_a'P_bP_cP_d(R) \, cl \quad (11\text{-}46)$$
$$Z_{P_b} = P_a'P_bP_cP_d(R) \, cl \quad (11\text{-}47)$$
$$Z_{P_c} = P_a'P_bP_cP_d(R) \, cl \quad (11\text{-}48)$$
$$Z_{P_d} = P_a'P_bP_cP_d(R) \, cl \quad (11\text{-}49)$$

(9) $P_9$ ($P_aP_b'P_c'P_d'$) The input conversion operation based on the second vehicle's received data signal is performed during $P_9$ and ends upon the overflow of the F counter, as described earlier for the $P_3$ interval. The $P_{10}$ program is thus entered in accordance with the following expression:

$$S_{P_d}=(P_aP_b'P_c'P_d')\ (F_1F_2F_3F_4D_{10})\ (Z_{D_{10}})\ cl \quad (12\text{-}19)$$

(10) $P_{10}$ ($P_aP_b'P_c'P_d$) In this program, the scaled down E register contents, a described for the $P_4$ interval, are added to the G register contents, the sum going back into the G register. This program is changed by the $T_{10}$ count into the $P_{11}$ program in accordance with the following expressions:

$$S_{P_c}=P_aP_b'P_c'P_dT_{10}\ cl \quad (11\text{-}50)$$
$$Z_{P_d}=P_aP_b'P_c'P_dT_{10}\ cl \quad (11\text{-}51)$$

(11) $P_{11}$ ($P_aP_b'P_c'P_d$) This program corresponds to the $P_5$ interval except that here, the G and H registers contents are added and the sum placed back into H. At the $T_{10}$ count, the next following $P_{12}$ program is obtained by:

$$S_{P_d}=P_aP_b'P_cP_d'T_{10}\ cl \quad (11\text{-}52)$$

(12) $P_{12}$ ($P_aP_b'P_cP_d$) This program is another wait program, similar to $P_6$, and at the next $t_0$ signal, signifying the beginning of the next first vehicle interrogation cycle, the earlier described $P_1$ program is obtained in accordance with the following expressions:

$$Z_{P_a}=P_aP_b'P_cP_dt_0\ cl \quad (11\text{-}53)$$
$$Z_{P_c}=P_aP_b'P_cP_dt_0\ cl \quad (11\text{-}54)$$
$$Z_{P_d}=P_aP_b'P_cP_dt_0\ cl \quad (11\text{-}55)$$

Additionally, program $P_8$ is switched to $P_1$ by $t_0$ if no return signal R is obtained in accordance with the following equations:

$$Z_{P_b}=P_a'P_cP_dP_bt_0\ cl \quad (11\text{-}56)$$
$$Z_{P_c}=P_a'P_bP_dP_ct_0\ cl \quad (11\text{-}57)$$
$$Z_{P_d}=P_a'P_bP_cP_dt_0\ cl \quad (11\text{-}58)$$

Adder 74, previously indicated in FIGURE 5, is shown detailed in FIGURE 13. A series of input lines designated $A_1$, $A_1'$, $A_2$ and $A_2'$ receive other flip-flop signals as programmed by the P flip-flops. The output signal propositions A and A' are produced by this adder circuit which are applied to the input terminals of other flip-flops, as also determined by the P programming flip-flops. A flip-flop K is included for holding carry digits generated in the addition processes. The remaining gating circuitry includes an "and" gate 150 receiving the $A_1$, $A_2$ and K signals on its respective three input terminals. In addition, signals $A_1$, $A_2'$ and K' are applied to the three input terminals of an "and" gate 151 while signals $A_1'$, $A_2$ and K' are applied to three input terminals of an "and" gate 152. Finally, signals $A_1'$, $A_2'$ and K are applied to three terminals of an "and" gate 153.

The output conductors of "and" gates 150, 151, 152, and 153 are coupled to the four input terminals of an "or" circuit 150 whose output signal constitutes the adder output signal A. Signal A is additionally applied to an inverter circuit 156 which provides a complementary or A' signal, representing the remaining adder output signal.

Signals $A_1$, $A_2$, K' and $cl$ are applied to an "and" gate 160 whose output signal goes to the $S_k$ input terminal of the K flip-flop. Signals $A_1'$, $A_2'$, K and $cl$ are applied to another "and" gating circuit 161 whose output signal is applied to one input terminal of an "or" circuit 162 whose output terminal, in turn, is connected to the $Z_k$ input terminal of the K flip-flop. Finally, the $t_0$ signal, with the clock signal $cl$, is applied to the other input terminal of gate 162. This $t_0\ cl$ term orders this carry flip-flop zeroed at the end of each P program where it is used for addition as may be necessary when it completes an add operation at its "set" state due to overflow.

The gating circuits, thus mechanized, correspond to the general binary serial addition operation defined in Boolean terms as follows:

$$A=A_1'A_2'K+A_1'A_2K'+A_1A_2'K'+A_1A_2K \quad (13\text{-}1)$$
$$A'=(A_1'A_2'K+A_1'A_2K'+A_1A_2'K'+A_1A_2K)' \quad (13\text{-}2)$$
$$S_K=A_1A_2K'\ cl \quad (13\text{-}3)$$
$$Z_K=A_1'A_2'K\ cl+t_0\ cl \quad (13\text{-}4)$$

Below are listed the various intervals programmed by the P flip-flops during which the adder is employed for adding various register contents.

$P_1$: The B and C register contents are added together and the results passed into D. The input signals programmed onto the $A_1$, $A_1'$, $A_2$ and $A_2'$ adder input conductors are:

$$A_1=B_1P_1\ cl \quad (13\text{-}5)$$
$$A_1'=B_1'P_1\ cl \quad (13\text{-}6)$$
$$A_2=C_1P_1\ cl \quad (13\text{-}7)$$
$$A_2'=C_1'P_1\ cl \quad (13\text{-}8)$$

The adder signal outputs go to the input terminals of the $D_{10}$ flip-flop, included in FIGURE 15b, in accordance with the following equations noting however that the complementary output term, shown cross coupled in the figures, may be omitted from the equations corresponding thereto:

$$S_{D_{10}}=AP_1\ cl \quad (15b\text{-}1)$$
$$Z_{D_{10}}=A'P_1\ cl \quad (15b\text{-}2)$$

$P_4$: During this interval, the E register error value, scaled down by 64, as described earlier, is added to the B register contents and the results stepped back into the B register. The equations defining the input to the adder are:

$$A_1=E_7P_4\ cl \quad (13\text{-}9)$$
$$A_1'=E_7'P_4\ cl \quad (13\text{-}10)$$
$$A_2=B_1P_4\ cl \quad (13\text{-}11)$$
$$A_2'=B_1'P_4\ cl \quad (13\text{-}12)$$

It will be understood that, in stepping down the contents of the E register from its most-to-least significant direction, the digit appearing initially in the $E_{14}$ stage is not changed and its value propagated down the register during consecutive steps. Accordingly, the sign digit will appear in the $E_6$ stage during the $T_8$, $T_9$ and $T_{10}$ intervals as is required for deriving a correct sign in the answer number as explained in more detail later. The output of the adder is applied to the $B_{10}$ flip-flop, as shown in FIGURE 16b, in accordance with the following equations:

$$S_{B_{10}}=AP_4cl \quad (16b\text{-}1)$$
$$Z_{B_{10}}=A'P_4\ cl \quad (16b\text{-}2)$$

$P_5$: During this program, the B register contents are divided by four and added to the C register, and the results being passed back into the C register for storage. The division is obtained by ignoring the contents of the least two significant bit flip-flops $B_1$ and $B_2$ and employing the $B_3$ flip-flop as the register output. As before, the sign digit appearing in $B_{10}$ is propagated down and appears in $B_3$ for the $T_8$ through $T_{10}$ time intervals. The equations of this operation are:

$$A_1=B_3P_5\ cl \quad (13\text{-}13)$$
$$A_1'=B_3'P_5\ cl \quad (13\text{-}14)$$
$$A_2=C_1P_5\ cl \quad (13\text{-}15)$$
$$A_2'=C_1'P_5\ cl \quad (13\text{-}16)$$

Since B and C are stepped out from their lower significant digit bits, the re-entry into C by the addition results above take place through the most significant digit place $C_{10}$. Hence, the equations defining the C register input operation are:

$$S_{C_{10}}=AP_5\ cl \quad (16b\text{-}3)$$
$$Z_{C_{10}}=A'P_5\ cl \quad (16b\text{-}4)$$

$P_7$: In this operation the contents of the G and H registers are added together and the results stepped into D. The corresponding adder input and output equations are:

$$A_1 = G_1 P_7 \, cl \quad (13\text{-}17)$$
$$A_1' = G_1' P_7 \, cl \quad (13\text{-}18)$$
$$A_2 = H_1 P_7 \, cl \quad (13\text{-}19)$$
$$A_2' = H_1' P_7 \, cl \quad (13\text{-}20)$$

The D register entry takes place through $D_{10}$ as follows:

$$S_{D_{10}} = A P_7 \, cl \quad (15b\text{-}3)$$
$$Z_{D_{10}} = A' P_7 \, cl \quad (15b\text{-}4)$$

$P_{10}$: Here, the E register contents, divided by 64, are added with the G register contents and passed back into G. The adder input, output and G register input equations, are:

$$A_1 = E_7 P_{10} \, cl \quad (13\text{-}21)$$
$$A_1' = E_7' P_{10} \, cl \quad (13\text{-}22)$$
$$A_2 = G_1 P_{10} \, cl \quad (13\text{-}23)$$
$$A_2' = G_1' P_{10} \, cl \quad (13\text{-}24)$$
$$S_{G_{10}} = A P_{10} \, cl \quad (16b\text{-}5)$$
$$Z_{G_{10}} = A' P_{10} \, cl \quad (16b\text{-}6)$$

$P_{11}$: During this interval, the G contents are divided by four, added to H and stepped back into H in accordance with the Boolean expressions given below:

$$A_1 = G_3 P_{11} \, cl \quad (13\text{-}25)$$
$$A_1' = G_3' P_{11} \, cl \quad (13\text{-}26)$$
$$A_2 = H_1 P_{11} \, cl \quad (13\text{-}27)$$
$$A_2' = H_1' P_{11} \, cl \quad (13\text{-}28)$$
$$S_{H_{10}} = A P_{11} \, cl \quad (16b\text{-}7)$$
$$Z_{H_{10}} = A' P_{11} \, cl \quad (16b\text{-}8)$$

Figure 14:
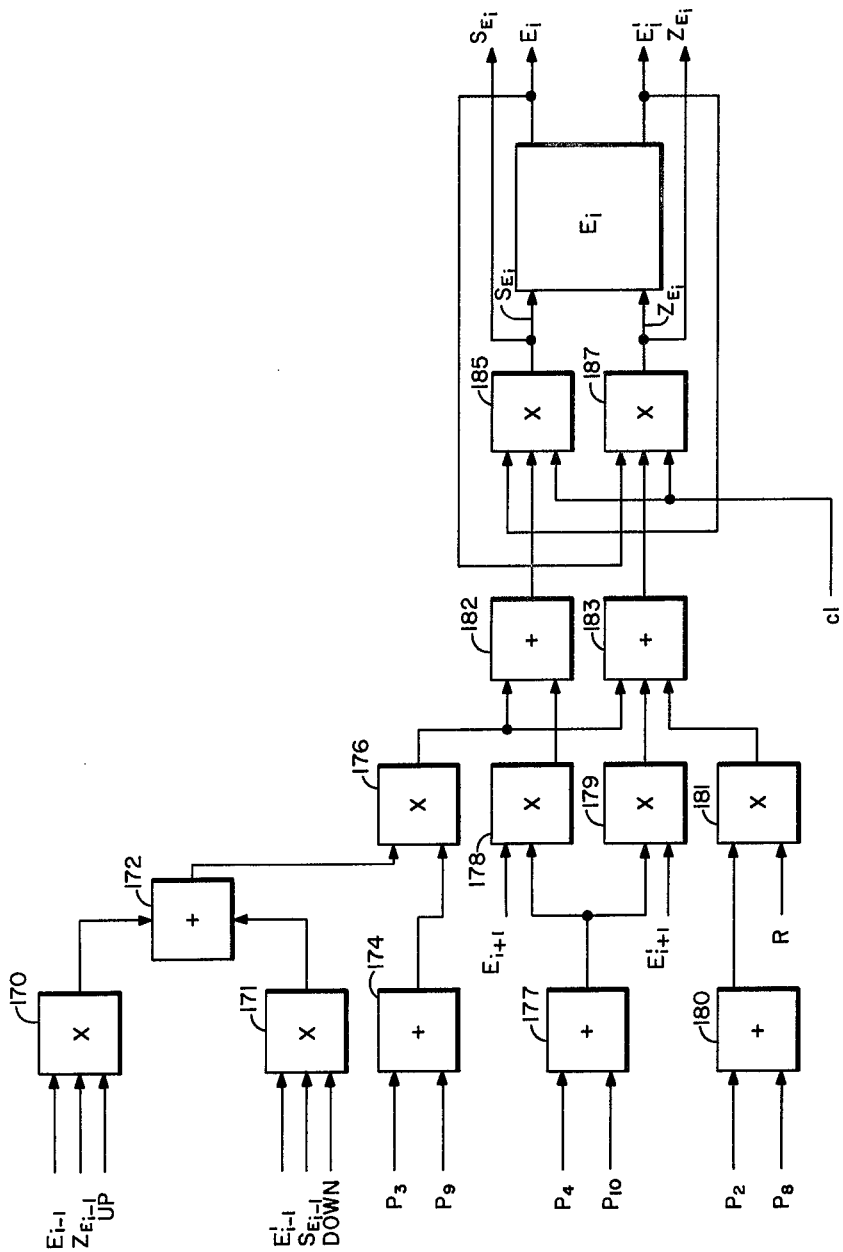
FIGURE 14 is a block diagrammatic representation of a typical flip-flop and associated input gating circuitry of the E register in the input converter.

FIGURE 14 illustrates a typical E register state, represented by a flip-flop designated $E_i$, and associated gating circuitry. This figure is taken as representative of the remaining E register flip-flops and the Boolean equations of its gating circuitry serve to define the remaining register gating circuitry, in the manner understood by those skilled in the art.

In particular, the output signal $E_{i-1}$, the signal $Z_{E_{i-1}}$ applied to zero input terminal of the preceding flip-flop $E_{i-1}$, not specifically illustrated, and the UP signal generated by the input logic circuit 75 of FIGURE 6, are applied to the three input terminals of an "and" circuit 170. In the same way the output signal $E_{i-1}'$, the input set triggering signal $S_{E_{i-1}}$ of the preceding flip-flop $E_{i-1}$, and the DOWN signal produced by the input logic circuit are applied to the three input terminals of an "and" gate 171. The output signals of gating circuits 170 and 171 are applied to the two input terminals of an "or" circuit 172. The $P_3$ and $P_9$ logic signals are applied to the two input terminals of an "or" circuit 174 whose output signal is applied, along with the output signal of "or" circuit 172, to the input terminals of an "and" gate 176. The $P_4$ and $P_{10}$ logic signals are applied to the two input terminals of an "or" circuit 177 whose output signal is applied to one input terminal of each of a pair of "and" gating circuits 178 and 179. The output signals $E_{i+1}$ and $E_{i+1}'$ of the next following flip-flop $E_{i+1}$, not specifically shown, are applied to the remaining input terminals of gating circuits 178 and 179, respectively.

The $P_2$ and $P_8$ logic proposition signals are applied to an "or" gate 180 whose output signal and signal R are applied to the two input terminals of an "and" circuit 181. The output signals of "and" circuits 176 and 178 are applied to the two input terminals of "or" circuit 182 while the output signals of gating circuits 176, 179 and 181 are applied to the three respective input terminals of an "or" circuit 183. The output signal of gate 182, the $E_1'$ output signal of the flip-flop, $E_1$ under discussion, and the clock signal $cl$ are applied to the three input terminals of an "and" circuit 185 in turn connected to the "set" or $S_{E_i}$ input terminal of flip-flop $E_i$. Finally, the output signal from gate 183, the $E_i$ output signal and the clock signal are coupled to an "and" gate 187, in turn coupled to the zero or $Z_{E_i}$ input terminal of the $E_i$ flip-flop.

As described earlier, the E register is programmed to act as an up-down counter during the $P_3$ and $P_9$ intervals, and serves to count up or add the clock pulses when the UP conductor from the input logic unit 75 is energized and is programmed to count down or subtract the clock pulses when the DOWN input conductor is energized. This counting takes place in a left-to-right direction viewed in FIGURE 5, that is, the least significant digit of the count falls in the $E_1$ flip-flop while the most significant digit of the count is found in the right hand or $E_{14}$ flip-flop.

For counting up, the generalized expressions for the set and zero terminals of the $i$th flip-flop are:

$$S_{E_i} = E_{i-1} E_{i-2} E_{i-3} \ldots (E_i)' \, cl \quad (14\text{-}1)$$
$$Z_{E_i} = E_{i-1} E_{i-2} E_{i-3} \ldots (E_i) \, cl \quad (14\text{-}2)$$

The generalized equations above simply denote that when all preceding flip-flops are simultaneously one, the conduction state of this $E_i$ flip-flop is reversed. In other words, ... 0111 ... goes to ... 1000 ... and ... 1111 ... goes to ... 0000 .... It will also be observed that whenever $E_i$ is ordered set for this UP counting case, the preceding flip-flop $E_{i-1}$ is ordered zeroed. Also, whenever $E_i$ is ordered zeroed, flip-flop $E_{i-1}$ is ordered set.

The generalized equations for down counting area:

$$S_{E_i} = E_{i-1}' E_{i-2}' E_{i-3}' \ldots (E_i)' \, cl \quad (14\text{-}3)$$
$$Z_{E_i} = E_{i-1}' E_{i-2}' E_{i-3}' \ldots (E_i)' \, cl \quad (14\text{-}4)$$

Here, when all preceding flip-flops are zero, the $E_i$ flip-flop conduction state is reversed. For example, ... 100 ... goes to ... 011 ... , and ... 000 ... goes to ... 111 .... Here, each time $E_i$ is triggered, that is, is ordered set or zeroed, the preceding flip-flop $E_{i-1}$ is ordered set.

The portion of the gating network dealing with the specific UP and DOWN counting operation for this representative $E_i$ flip-flop case are:

$$S_{E_i} = [(E_{i-1})(Z_{E_{i-1}})\text{UP} + (E_{i-1})'(S_{E_{i-1}})\text{DOWN}]$$
$$E_i'(P_3 + P_9) \, cl \quad (14\text{-}5)$$
$$Z_{E_i} = [(E_{i-1})(Z_{E_{i-1}})\text{UP} + (E_{i-1})'(S_{E_{i-1}})\text{DOWN}]$$
$$E_i(P_3 + P_9) \, cl \quad (14\text{-}6)$$

The above equations quite obviously hold for the $E_2$ through $E_{14}$ flip-flops. The simpler equations for the first flip-flops, $E_1$ of the register are:

$$S_{E_i} = (\text{UP} + \text{DOWN}) E_1'(P_3 + P_9) \, cl \quad (14\text{-}7)$$
$$Z_{E_i} = (\text{UP} + \text{DOWN}) E_1(P_3 + P_9) \, cl \quad (14\text{-}8)$$

As noted earlier, during $P_4$ and $P_{10}$, the E register contents are stepped out of the $E_7$ flip-flop in a most-to-least significant digit direction and passed into the adder unit, as previously noted. This means that $E_{i+1}$ must during these programs be stepped backward into $E_i$ in accordance with the following two expressions:

$$S_{E_i} = E_{i+1} E_i'(P_4 + P_{10}) \, cl \quad (14\text{-}9)$$
$$Z_{E_i} = E_{i+1}' E_i(P_4 + P_{10}) \, cl \quad (14\text{-}10)$$

Since $E_i$ is taken as a general case it will be understood that this stepping operation applies to all flip-flops except that, quite naturally, no values are entered into the most significant flip-flop $E_{14}$ and hence its initial value is not changed during the operation. Accordingly, since it initially holds the sign digit of the previously accumulated error number, this sign digit will be propagated down the register to appear in the $E_7$ flip-flop during the $T_8$, $T_9$, and $T_{10}$ intervals, as required.

The final operation required is that of clearing all stages of the E register prior to each input conversion cycle. This is done by applying the R signal during the $P_2$ and $P_8$ programs to each flip-flop zero input terminal in accordance with the below equation:

$$Z_{E_i} = R(P_2 + P_8) E_i \: cl \qquad (14\text{-}11)$$

In summary, the complete Boolean expressions for the set and zero input terminals of the representative E register stage illustrated in FIGURE 14 are:

$$S_{E_i} = \{[(E_{i-1})(Z_{E_{i-1}})\text{UP} + (E_{i-1})'(S_{E_{i-1}})\text{DOWN}]$$
$$(P_3 + P_9) + E_{i+1}(P_4 + P_{10})\} E_i' \: cl \qquad (14\text{-}12)$$
$$Z_{E_i} = \{[(E_{i-1})(Z_{E_{i-1}})\text{UP} + (E_{i-1})'(S_{E_{i-1}})\text{DOWN}]$$
$$(P_3 + P_9) + E_{i+1}'(P_4 + P_{10}) + R(P_2 + P_8)\} E_i \: cl \qquad (14\text{-}13)$$

FIGURE 15a shows a typical stage $D_i$ of the D register 72 with its associated input gating circuitry. In particular, the $P_3$ and $P_9$ programming logic signals are applied to an "or" circuit 190 whose output signal is applied to one input terminal of an "and" gating circuit 191. The $P_1$ and $P_7$ signal propositions are coupled to an "or" circuit 196 whose output terminal is connected to one input terminal of each of a pair of "and" gates 192 and 195. The input proposition $S_{D_{i-1}}$, applied to the set terminal of the preceding $D_{i-1}$ flip-flop, not specifically illustrated, and the $D_{i-1}$ output signal from the preceding flip-flop $D_{i-1}$ are applied to the two remaining input terminals of gate 191. The $D_{i+1}$ output signal from the next following flip-flop $D_{i+1}$, not shown, is applied to the other input terminal of "and" circuit 192. The $D_{i+1}'$ output signal from the next following $D_{i+1}$ flip-flop is applied to the final input terminal of gate 195.

The output signals of gating circuits 191 and 192 are applied to an "or" circuit 200 while the output signals of gating circuits 191 and 195 are applied to the two input terminals of an "or" circuit 201. The clock signal, $D_i'$ signal and "or" circuit 200 signals are applied to the three respective input terminals of an "and" gating circuit 202, in turn, coupled to the $S_{D_i}$ input terminal of this $D_i$ flip-flop. In the same way, the clock signal $cl$, $D_i$ and the output signal of "or" circuit 201 are applied to the three input terminals of an "and" gating circuit 203, whose output terminal is coupled to the $Z_{D_i}$ input conductor of the $D_i$ flip-flop.

In operation, during the $P_3$ and $P_9$ input conversion intervals, the D register is programmed as a normal binary up-counter to count the clock signal $cl$ cycles. The portions of the gating circuit defining this operation are:

$$S_{D_i} = (S_{D_{i-1}})(D_{i-1})D_i'(P_3 + P_9) \: cl \qquad (15\text{-}1)$$
$$Z_{D_i} = (S_{D_{i-1}})(D_{i-1})D_i(P_3 + P_9) \: cl \qquad (15\text{-}2)$$

During the $P_1$ and $P_7$ intervals, the adder output signals A and A', FIGURE 13, are stepped into the $D_{10}$ flip-flop and, from there, stepped into the D register in a left-to-right or most-to-least significant bit direction. The portion of the gating circuitry shown in FIGURE 15a for the stepping operation is as follows:

$$S_{D_i} = (D_{i+1}) D_i'(P_1 + P_7) \: cl \qquad (15\text{-}3)$$
$$Z_{D_i} = (D_{i+1})' D_i (P_1 + P_7) \: cl \qquad (15\text{-}4)$$

The overall Boolean input expressions for flip-flop $D_i$ are:

$$S_{D_i} = \{(D_{i-1})(S_{D_{i-1}})(P_3 + P_9)$$
$$+ D_{i+1}(P_1 + P_7)\} D_i' \: cl \qquad (15\text{-}5)$$
$$Z_{D_i} = \{(D_{i-1})(S_{D_{i-1}})(P_3 + P_9)$$
$$+ D_{i+1}'(P_1 + P_7)\} D_i \: cl \qquad (15\text{-}6)$$

The input connections to the final flip-flop $D_{10}$ differs from the general $D_i$ flip-flop case shown in FIGURE 15a, in that the output signal of the adder circuit is stepped into it during the $P_1$ and $P_7$ intervals. Hence, instead of having $D_{i+1}$ and $D_{i+1}'$ connected to "and" circuits 192 and 195, the pair of adder complementary output signals A and A' are employed. This difference in connections are illustrated in FIGURE 15b and as such, represents the only D register difference from the generalized stage shown in FIGURE 15a.

FIGURE 16a represents a typical flip-flop stage $B_i$, of the B register and is shown for the purpose of illustrating a typical stage of the similar C, G and H registers, in addition to the B register. In particular, programming logic signals $P_1$, $P_4$ and $P_5$ are applied to an "or" gate circuit 206 whose output signal is applied to one input terminal of each of a pair of "and" gates 207 and 208, in turn, connected to the $S_{B_i}$ and $Z_{B_i}$ input terminals, respectively, of the $B_i$ flip-flop. Signal $B_{i+1}$, from the next following flip-flop stage $B_{i+1}$, not specifically illustrated signal $B_i'$ and the clock signal $cl$ are applied to the remaining input terminals of gating circuit 207. In the same way, the $B_{i+1}'$ signal of the next flip-flop register, the $B_i$ signal, and the clock signal are applied to the remaining input terminals of gating circuit 208.

As will be recalled from FIGURE 5, the most-to-least significant digits of the B register number are stored in a left-to-right direction so that whenever its contents are stepped out to the adder, as occurs during the $P_1$, $P_4$ and $P_5$ intervals, the least significant digit will appear first, as is required for the addition process. Accordingly, all stepping takes place in a most-to-least significant direction that is, from a $B_{i+1}$ to a $B_i$ flip-flop direction as is indicated by the specific connections shown in FIGURE 16a. The generalized stepping equations for the $B_i$ flip-flop are:

$$S_{B_i} = (B_{i+1}) B_i' (P_1 + P_4 + P_5) \: cl \qquad (16\text{-}1)$$
$$Z_{B_i} = (B_{i+1}') B_i (P_1 + P_4 + P_5) \: cl \qquad (16\text{-}2)$$

During the $P_4$ interval, the output adder digit orders are applied to the most significant digit flip-flop stage, $B_{10}$, and the input connections to the $B_{10}$ flip-flop are illustrated in FIGURE 16b since they differ from the general $B_i$ case of FIGURE 16a. Here, gating circuits 207 and 208 receive the $P_4$ gating signals and the A and A' signals, respectively, furnished by the adder circuit instead of the "or" circuit 206 and $B_{i+1}$ flip-flop signals as was the $B_i$ FIGURE 16a case. Accordingly, during the $P_4$ interval, the clock signal acts to step the consecutive sum digits produced by the adder into this most significant digit stage $B_{10}$ of the B register, where they are then stepped down the register for storage.

The equations defining FIGURE 16b input circuitry are:

$$S_{B_{10}} = A B_{10}' P_4 \: cl \qquad (16\text{-}3)$$
$$Z_{B_{10}} = A' B_{10} P_4 \: cl \qquad (16\text{-}4)$$

The C register contents are stepped down and out, similarly to the B register, during the $P_1$ and $P_5$ intervals and the general C register stage $C_i$ is mechanized, not shown, in accordance with the following equations:

$$S_{C_i} = (C_{i+1}) C_i' (P_1 + P_5) \: cl \qquad (16\text{-}5)$$
$$Z_{C_i} = (C_{i+1})' C_i (P_1 + P_5) \: cl \qquad (16\text{-}6)$$

The $C_{10}$ flip-flop of the C register is, similarly to the $D_{10}$ flip-flop of the D register, connected differently than the general $C_i$ stage and the equations defining its input connections are:

$$S_{C_{10}} = A C_{10}' P_5 \: cl \qquad (16\text{-}7)$$
$$Z_{C_{10}} = A' C_{10} P_5 \: cl \qquad (16\text{-}8)$$

The G register contents are stepped out during the $P_7$, $P_{10}$ and $P_{11}$ intervals and receives the adder output signal as its input signal during the $P_{10}$ interval. The equations defining the general $G_i$ stage input mechanization, and its input $G_{10}$ flip-flop are as follows:

$$S_{G_i} = G_{i+1} G_i' (P_7 + P_{10} + P_{11}) \: cl \qquad (16\text{-}9)$$
$$Z_{G_i} = G_{i+1}' G_i (P_7 + P_{10} + P_{11}) \: cl \qquad (16\text{-}10)$$
$$S_{G_{10}} = A G_{10}' P_{10} \: cl \qquad (16\text{-}11)$$
$$Z_{G_{10}} = A' G_{10} P_{10} \: cl \qquad (16\text{-}12)$$

Finally, the H register is stepped out during the $P_7$, $P_{10}$ and $P_{11}$ intervals with the $H_{10}$ flip-flop stage receiving the adder output values during the $P_{11}$ interval. The equations governing the typical $H_i$ flip-flop and the $H_{10}$ flip-flop input connections are:

$$S_{H_i} = H_{i+1} H_i'(P_7 + P_{10} + P_{11}) \, cl \quad (16\text{-}13)$$
$$Z_{H_i} = H_{i+1}' H_i (P_7 + P_{10} + P_{11}) \, cl \quad (16\text{-}14)$$
$$S_{H_{10}} = A H_{10}' P_{11} \, cl \quad (16\text{-}15)$$
$$Z_{H_{10}} = A' H_{10} P_{11} \, cl \quad (16\text{-}16)$$

A typical stage, $F_i$, of the four stage F divider 73 from FIGURE 5, is shown in FIGURE 17. The $P_3$ and $P_9$ programming signals are applied to an "or" gate 211 whose output signal, inturn, is applied to one input terminal of a three terminal "and" circuit 212. The $Z_{F_{i-1}}$ signal, applied to the zero input terminal of the preceding stage $F_{i-1}$, not shown, and the preceding stage's $F_{i-1}$ output signal are applied to the remaining two input terminals of circuit 212. The output signal of gate 211 is applied to one input terminal of each of a pair of "and" circuits 213 and 214, whose output terminals are coupled to the $S_{F_i}$ and the $Z_{F_i}$ input conductors of the $F_i$ flip-flop. The $F_i$ and $F_i'$ signals from this flip-flop are applied to another input terminal of each of "and" gates 214 and 213, respectively, while the clock signal cl is applied to the final input terminal of each of this pair of gating circuits.

The operation of the $F_i$ flip-flop as a counter stage will be apparent from previous discussions given of the E register in its UP count mode. The general equations defining the gating circuits connected to this typical $F_i$ stage are:

$$S_{F_i} = (P_3 + P_9) Z_{F_{i-1}} F_{i-1} F_i' \, cl \quad (17\text{-}1)$$
$$Z_{F_i} = (P_3 + P_9) Z_{F_{i-1}} F_{i-1} F_i \, cl \quad (17\text{-}2)$$

The first or $F_1$ stage will have the $D_{10}$ signal and the $Z_{D_{10}}$ signal applied to the two input terminals of its gating circuit corresponding to circuit 212 instead of the $Z_{F_{i-1}}$ and $F_{i-1}$ signals shown, as will be apparent from the previous discussion of the D register's connection to this F divider unit.

It will be appreciated by those skilled in the art that the specific embodiment set forth for illustrating the present invention represents only one of a number of possible variations capable of achieving substantially the same result without involving invention. For example, the digital portion of the present invention has been mechanized with flip-flops being employed as the primary source of number storage. It will be apparent to those skilled in the digital computer art that other digital storage mechanisms, for example, magnetic memory drums or discs, acoustic or magnetostrictive delay lines, random excess storage units may be employed instead of the flip-flops illustrated. The application of these other storage mechanisms to the basic invention will be apparent to those skilled in the digital computer design art.

In the same way, the particular arrangement of adders, counters, registers, etc. as specifically shown, represents only one possible configuration capable of performing the basic digital filtering, smoothing and prediction process as illustrated broadly in FIGURES 3a and 3b. The particular order of steps performed may be varied, an independent clock source may be employed which has no basic relationship to the remaining systems, the particular two-register filtering process may obviously be varied to include additional registers, other than transfer multiplying constants, etc. In particular, the number of registers employed for storage in the prediction and smoothing process, the constants employed in their multiplication, and the particular order of and the transfers made will be determined somewhat by the nature of the information to be filtered, the rate of its change, sample period, signal-to-noise ratio, and any variation, from the particular mechanization illustrated would not involve invention.

Also, the two-target DME system, as illustrated, is indicative only of multi-target capabilities and represents the application of the general technique to multiple target tracking capabilities. Quite obviously, the techniques of the present invention may be applied to tracking a greater number of targets without involving invention.

It will also be appreciated that the circuits illustrated in block diagrammatic form, including flip-flops, "and" circuits, "or" circuits, etc., may each take any one of a number of specific embodiments as known in the art and described in textbooks, periodicals, etc., without involving invention. Finally, it will be appreciated by those skilled in the art that the foregoing description relates only to one detailed embodiment of the present invention but whose scope and spirit is set forth in the embodied claims.

What is claimed is:

1. A digital computer system for producing binary numbers at spaced intervals whose values correspond to the filtered average of varying analog input information, said system comprising: first means for storing at least a pair of binary numbers; second means for mathematically combining the pair of numbers stored by said first means at each of said spaced intervals to produce an output number; third means for deriving a number representing the difference between the output number produced by said second means and the value of the analog information at each of said spaced intervals; and fourth means responsive to each difference number produced by said third means for modifying the magnitude of the pair of numbers stored by said first means in a direction to make the value of the next number produced by said second means closer to the previous value of the analog information.

2. A digital computer system for producing binary numbers at spaced intervals whose values correspond to the filtered average of varying analog input information, said system comprising: first means for storing at least a pair of binary numbers; second means for mathematically combining the pair of numbers stored by said first means at each of said spaced intervals to produce an output number, said second means including first digital adder means for adding a fixed proportion of one of said pair of numbers to the other of said pair of numbers to form said output number; third means for deriving a number representing the difference between the output number produced by said second means and the value of the analog information at each of said spaced intervals; and fourth means for modifying the magnitude of the pair of numbers stored by said first means in a direction to make the value of the next number produced by said second means closed to the previous value of the analog information.

3. A digital computer system for producing binary numbers at spaced intervals whose values correspond to the filtered average of varying analog input information, said system comprising: first means for storing at least a pair of binary numbers; second means for mathematically combining the pair of numbers stored by said first means at each of said spaced intervals to produce an output number, said second means including first digital adder means for adding a fixed proportion of one of said pair of numbers to the other of said pair of numbers to form said output number; third means for deriving a number representing the difference between the output number produced by said second means and the value of the analog information at each of said spaced intervals, said third means including means for effectively forming additional analog information corresponding to said output number, and means responsive to the difference between said input analog information and said additional analog information for producing said difference number; and fourth means responsive to each difference number produced by said third means for modifying the magnitude of the pair of numbers stored by said first means in a direction to make the value of the next number produced by said second means closer to the previous value of the analog information.

4. A digital computer system for producing binary numbers at spaced intervals whose values correspond to the filtered average of varying analog input information, said system comprising: first means for storing at least a pair of binary numbers; second means for mathematically combining the pair of numbers stored by said first means at each of said spaced intervals to produce an output number, said second means including first digital adder means for adding a fixed proportion of one of said pair of numbers to the other of said pair of numbers to form said output number; third means for deriving a number representing the difference between the output number produced by said second means and the value of the analog information at each of said spaced intervals, said third means including means for effectively forming additional analog information corresponding to said output number, and means responsive to the difference between said input analog information and said additional analog information for producing said difference number; and fourth means responsive to each difference number produced by said third means for modifying the magnitude of the pair of numbers stored by said first means in a direction to make the value of the next number produced by said second means closer to the previous value of the analog information, said fourth means including second digital adder means for adding a proportion of said difference number to said one of said pair of binary numbers and third digital adder means for adding a proportion of said one number as modified by said second digital adder means to the other number of said pair of numbers.

5. A digital computer system for producing output binary numbers at spaced intervals whose values correspond to the filtered average of varying analog input information occurring as the phase difference between a pair of analog signals, said system comprising: digital means for storing at least a pair of binary numbers, said digital means being responsive when actuated for adding the stored pair of numbers to produce an output number representing the predicted phase difference between the pair of analog signals; means for actuating said digital means at said spaced intervals; means responsive to the actual phase difference between the pair of analog signals at each of said spaced intervals for changing the next output number produced by said digital means by an amount corresponding to the actual phase difference to form a resulting error binary number representing the difference between the predicted and measured actual phase differences; and correction means for modifying the pair of numbers stored by said digital means by an amount proportional to the error number produced by the last-named means in a direction to make the predicted value produced by the next actuation of said digital means closer in value to the last measured analog phase difference number.

6. The digital computer system according to claim 5 in which said last-named means includes counting means for counting down said output number an amount corresponding to the phase difference between said pair of signals, the number remaining after the counting down operation representing said error binary number.

7. The digital computer system according to claim 6 in which said correction means modifies said pair of numbers stored by said digital means by adding said error number to one of said pair of numbers and then adding the resulting number to the remaining number of said pair of numbers.

8. A digital computer system for producing a binary number at periodic intervals whose magnitude represents the averaged phase difference between first and second signals, said system comprising: binary number storage means responsive when actuated for producing an output binary number whose magnitude represents a predicted phase difference between the first and second signals, said binary number storage means being responsive to input binary numbers representing the error between predicted and actual phase difference values for improving its next predicted value; means for actuating said binary number storage means at periodic intervals; means responsive to each actuation of said binary storage means for producing a binary number representing the difference between the actual and predicted phase differences between the first and second signals; and means for applying the binary number produced by the last named means to said binary number storage means as an error number whereby said storage means improves its next predicted value.

9. A digital filtering system producing a series of consecutive output binary numbers during consecutive sample intervals representing the filtered phase shift between a pair of applied input signals, said system comprising: first and second register means storing first and second binary numbers, respectively; third register means; means for adding the contents of said first and second register means to said third register means at the beginning of each of said sample intervals, the resulting sum in said third register means representing the output binary number of that sample interval; error register means; error number producing means operable during each sample interval for comparing the phase shift between the pair of input signals and the output number in said third register means and producing a number in said error register means corresponding to their difference; means operable in each sample interval for adding a portion of the error number in said error register means to said first register means; and means operable during each sample interval for adding a portion of the contents of said first register means to said second register means whereby the first and second binary numbers stored by said first and second register means are modified each sample interval in accordance with the error value just measured.

10. The digital filtering system according to claim 9 in which said error number producing means includes means operable each sample interval for counting into the output number in said third register means; comparison means operable when actuated for producing up and down output pulses when said pair of signals are of the same and opposite polarities, respectively; means responsive to the first overflow of the output number in the third register means for actuating said comparison means; means for applying the up and down pulses produced by said comparison means to said error number register whereby said error register means begins to accumulate said error number, and means responsive to a predetermined number of overflows of said third register means for deactivating said comparison means whereby the resulting summation of the up and down pulses in said error register means represents said error number.

11. A distance measuring system including: transmitter means for transmitting a first carrier signal modulated by a range signal; transponder means responsive to the signal transmitted by said transmitter means for transmitting a second carrier signal modulated by said range signal; receiver means associated with said transmitter means for receiving the signal transmitted by said transponder means, the phase difference between the transmitted and returned range signal representing the slant range between said transmitter and said transponder means; and digital filtering means associated with said transmitter means and operable at periodic intervals for producing output binary numbers representing the filtered phase difference between said transmitted and returned range signals, said digital filtering means including means responsive to the difference between the actual phase difference and each output binary number for producing an error number, and means for employing each error number for modifying the value of the next output binary number in a direction to decrease the error number just produced whereby the output numbers produced by said digital filtering means during said periodic intervals represent tracking information between said transmitter and transponder means.

References Cited by the Examiner

UNITED STATES PATENTS 3,025,514  3/1962  Alexander et al.
3,033,453  5/1962  Lode _____ 235—152
3,075,189  1/1963  Lisicky _____ 343—5

FOREIGN PATENTS 750,005  6/1956  Great Britain.

CHESTER L. JUSTUS, *Primary Examiner.*

R. E. KLEIN, L. H. MYERS, *Assistant Examiners.*